US012598332B2

(12) United States Patent
Brandt et al.

(10) Patent No.: US 12,598,332 B2
(45) Date of Patent: Apr. 7, 2026

(54) PROCESSING OF MULTI-VIEW VIDEO

(71) Applicants: Koninklijke KPN N.V., Rotterdam (NL); Nederlandse Organisatie Voor Toegepast-Natuurwetenschappelijk Onderzoek TNO, 's-Gravenhage (NL)

(72) Inventors: Aschwin Steven Reinier Brandt, The Haag (NL); Emmanouil Potetsianakis, The Hague (NL); Emmanuel Thomas, Delft (NL)

(73) Assignees: Koninklijke KPN N.V., Rotterdam (NL); Nederlandse Organisatie Voor Toegepast-Natuurwetenschappelijk Onderzoek TNO, 's-Gravenhage (NL)

( * ) Notice: Subject to any disclaimer, the term of this patent is extended or adjusted under 35 U.S.C. 154(b) by 0 days.

(21) Appl. No.: 18/259,728

(22) PCT Filed: Dec. 23, 2021

(86) PCT No.: PCT/EP2021/087503
§ 371 (c)(1),
(2) Date: Jun. 28, 2023

(87) PCT Pub. No.: WO2022/144302
PCT Pub. Date: Jul. 7, 2022

(65) Prior Publication Data
US 2024/0080501 A1 Mar. 7, 2024

(30) Foreign Application Priority Data

Dec. 31, 2020 (EP) .................................... 20218014

(51) Int. Cl.
*H04N 21/218* (2011.01)
*H04L 65/70* (2022.01)
(Continued)

(52) U.S. Cl.
CPC ....... *H04N 21/21805* (2013.01); *H04L 65/70* (2022.05); *H04L 65/75* (2022.05);
(Continued)

(58) Field of Classification Search
CPC ......... H04N 21/21805; H04N 21/2343; H04N 21/26258; H04N 21/23439; H04N 21/472; H04N 21/64784; H04N 21/8456
See application file for complete search history.

(56) References Cited

U.S. PATENT DOCUMENTS 8,633,964 B1 * 1/2014 Zhu ...................... H04N 21/472
348/36
8,806,050 B2 8/2014 Chen et al.
(Continued)

FOREIGN PATENT DOCUMENTS

CN 110463211 A 11/2019
JP 2010-530702 A 9/2010
(Continued)

OTHER PUBLICATIONS

Chen, S. E., et al., "View Interpolation for Image Synthesis", Proceedings of the 20th Annual Conference on Computer Graphics and Interactive Techniques, 1993, 10 pages.
(Continued)

*Primary Examiner* — Pinkal R Chokshi
(74) *Attorney, Agent, or Firm* — Hamilton, Brook, Smith & Reynolds, P.C.

(57) ABSTRACT

A method of processing multi-view video data by an server is described, wherein the method may comprise receiving one or more first multi-view parameters from a client device, the one or more multi-view parameters being indicative of a first data format associated with a multi-view display device of the client device; receiving a request for a segment sent by the client device based on a manifest file, the segment
(Continued)

receiving one or more first multi-view parameters from a client device, the one or more multi-view parameters being indicative of a first data format associated with a multi-view display device of the client device;
402 receiving a request for a segment sent by the client device to a content source based on a manifest file, the segment request comprising a segment resource locator identifying a first source segment comprising first multi-view video data, the segment resource locator comprising one or more second multi-view parameters indicating that the first multi-view video data are of a second data format;
404 generating a segment of the first data format based on the one or more first multi-view parameters, the first multi-view video data and, optionally, further multi-view video data associated with one or more further source segments; and,
406 transmitting the generated segment to the client device.
408 request comprising a segment resource locator identifying a first source segment comprising first multi-view video data, the segment resource locator comprising one or more second multi-view parameters indicating that the first multi-view video data are of a second data format; generating a segment of the first data format based on the one or more first multi-view parameters, the first multi-view video data and, optionally, further multi-view video data associated with one or more further source segments; and, transmitting the generated segment to the client device.

12 Claims, 11 Drawing Sheets

(51) Int. Cl.

| | |
|---|---|
| *H04L 65/75* | (2022.01) |
| *H04L 67/02* | (2022.01) |
| *H04N 21/2343* | (2011.01) |
| *H04N 21/262* | (2011.01) |
| *H04N 21/472* | (2011.01) |

(52) U.S. Cl.
CPC ......... *H04L 67/02* (2013.01); *H04N 21/2343* (2013.01); *H04N 21/26258* (2013.01); *H04N 21/472* (2013.01)

(56) References Cited

U.S. PATENT DOCUMENTS

| | | | |
|---|---|---|---|
| 12,356,053 B2 | 7/2025 | Potetsianakis et al. | |
| 2004/0066555 A1 | 4/2004 | Nomura | |
| 2010/0161686 A1* | 6/2010 | Yun ...................... | H04N 13/161 707/812 |
| 2012/0257018 A1 | 10/2012 | Shigemura et al. | |
| 2016/0253795 A1 | 9/2016 | Cole et al. | |
| 2016/0269794 A1* | 9/2016 | Shimura ............ | H04N 21/4316 |
| 2017/0237965 A1 | 8/2017 | Wang et al. | |
| 2017/0337711 A1 | 11/2017 | Ratner et al. | |
| 2018/0220166 A1* | 8/2018 | Meyer ........... | H04N 21/234363 |
| 2018/0343472 A1 | 11/2018 | Wang et al. | |
| 2019/0020880 A1 | 1/2019 | Wang | |
| 2019/0041728 A1 | 2/2019 | Vasudev | |
| 2019/0068946 A1 | 2/2019 | Stockhammer et al. | |
| 2019/0104326 A1* | 4/2019 | Stockhammer .... | H04N 21/6377 |
| 2020/0177809 A1 | 6/2020 | Hannuksela | |
| 2020/0236406 A1* | 7/2020 | Bastian ................ | H04N 21/234 |
| 2021/0006614 A1 | 1/2021 | Oyman et al. | |
| 2021/0029386 A1 | 1/2021 | Hamada et al. | |
| 2021/0127144 A1 | 4/2021 | Deshpande | |
| 2021/0195263 A1* | 6/2021 | Garcia Sanchez ........................... | H04N 21/8456 |
| 2021/0409670 A1* | 12/2021 | Oh ................... | H04N 21/23614 |
| 2022/0078486 A1 | 3/2022 | Hannuksela | |
| 2023/0379554 A1 | 11/2023 | Potetsianakis et al. | |

FOREIGN PATENT DOCUMENTS

| | | |
|---|---|---|
| WO | 2018/162509 A2 | 9/2018 |
| WO | 2018/179843 A1 | 10/2018 |
| WO | 2019/187442 A1 | 10/2019 |
| WO | 2020/198164 A1 | 10/2020 |
| WO | 2022144284 A1 | 7/2022 |

OTHER PUBLICATIONS

Ozcinar, C., et al., "Dynamic adaptive 3D multi-view video streaming over the internet", '13 proceedings of the 2013 ACM International Work Shop on Immersive Media experiences, Oct. 2013, pp. 51-56.

International Search Report and Written Opinion for Int'l Application No. PCT/EP2021/087503, Date Mailed: Apr. 20, 2022.

Blinder et al., "Signal processing challenges for digital holographic video display systems," Signal processing: image communication, 70 (2019) p. 114-130.

* cited by examiner

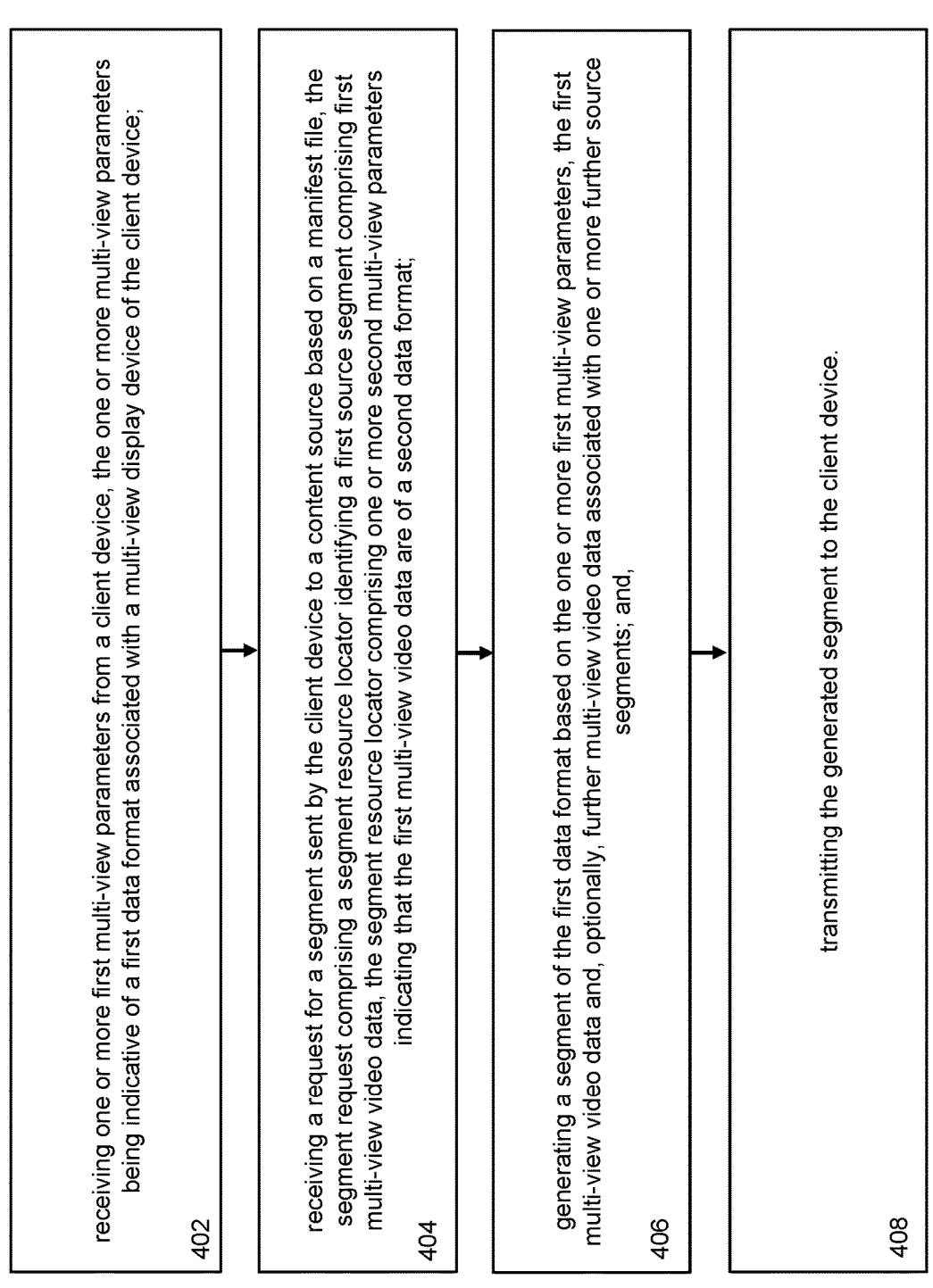

receiving one or more first multi-view parameters from a client device, the one or more multi-view parameters being indicative of a first data format associated with a multi-view display device of the client device;

402 receiving a request for a segment sent by the client device to a content source based on a manifest file, the segment request comprising a segment resource locator identifying a first source segment comprising first multi-view video data, the segment resource locator comprising one or more second multi-view parameters indicating that the first multi-view video data are of a second data format;

404 generating a segment of the first data format based on the one or more first multi-view parameters, the first multi-view video data and, optionally, further multi-view video data associated with one or more further source segments; and,

406 transmitting the generated segment to the client device.

| 3 | 6 | 9 |
|---|---|---|
| 2 | 5 | 8 |
| 1 | 4 | 7 |

(B)

| 7 | 8 | 9 |
|---|---|---|
| 4 | 5 | 6 |
| 1 | 2 | 3 |

(C)

| 6 | 12 | 18 | 24 | 30 | 36 |
|---|----|----|----|----|----|
| 5 | 11 | 17 | 23 | 29 | 35 |
| 4 | 10 | 16 | 22 | 28 | 34 |
| 3 | 9  | 15 | 21 | 27 | 33 |
| 2 | 8  | 14 | 20 | 26 | 32 |
| 1 | 7  | 13 | 19 | 25 | 31 |

(D)

| 8 | 7 | 6 | 5 | 2 | 1 |
|---|---|---|---|---|---|
| 12 | 11 | 10 | 9 | | |
| 16 | 15 | 14 | 13 | 4 | 3 |
| 20 | 19 | 18 | 17 | | |

FIG. 9

PROCESSING OF MULTI-VIEW VIDEO

This application is the U.S. National Stage of International Application No. PCT/EP2021/087503, filed on Dec. 23, 2021, which designates the U.S., published in English, and claims priority under 35 U.S.C. § 119 or 365(c) to European Application No. 20218014.7, filed on Dec. 31, 2020. The entire teachings of the above applications are incorporated herein by reference.

FIELD OF THE INVENTION

The invention relates to processing of multi-view video, and, in particular, though not exclusively, to methods and systems for processing a multi-view video, a server and a client configured to process multi-view video, a data structure for processing multi-view video and a computer program product for executing such methods.

BACKGROUND OF THE INVENTION

Currently new classes of 3D video displays are being developed that provide a true 3D holographic experience without the need of special glasses, e.g. polarization glasses. An overview of these displays is provided in the article by Blinder et al, *Signal processing challenges for digital holographic video display systems*, Signal processing: image communication 70 (2019) p. 114-130. These displays include special optics that produce different visual information depending on the viewer's eye position and gaze direction. The content consumed by such displays may be generated by capturing a real or virtual scene with objects using real or virtual cameras with slight viewing angle displacements while focusing on the same scene. A sequence of video frames generated by each of the cameras is generally referred to as a "view" and the video content for such 3D displays that is produced on the basis of views is referred to as multi-view video. To produce the 3D effect, at least a number of views needs to be processed and rendered simultaneously by the display.

As a simple example, well known auto-stereoscopy displays use views captured from two cameras in distance similar to the distance of an eye pair, with both cameras focusing on the same subject. Due to the uniform type of cameras, their proximity and their singular focus the context of each stream is identical, and the content has significant (visual) similarities between each stream. Typically, the 3D effect of auto-stereoscopic displays is poor because of the limited information that is encoded in the two images. Ozcinar et al, describe in their article *Dynamic Adaptive Multi-View Video streaming over the Internet, ImmersiveMe '13*: proceedings of the 2013 ACM international workshop on Immersive media experiences, October 2013, pp. 51-56, an HTTP based adaptative streaming process for streaming a 3D free-viewpoint video to clients. The authors describe a MPEG-DASH scheme for a 3D free-viewpoint-type multi-view video for rendering on a conventional auto-stereoscopic display. In a 3D free-viewpoint scheme, a user is able to navigate through a scene based on user control. To that end, multiple views and depth information are transmitted to the client. For a particular viewpoint, a conventional stereoscopic image is constructed based on two views. Typically, the 3D effect of such auto-stereoscopic displays is poor because of the limited information that is encoded in the two images. More realistic "holographic" effects can be achieved using displays that are capable of simultaneously rendering a large number of views, e.g. tens of views, wherein the angular sampling pitch of the different views is small enough so that multiple rays emanating from the same screen point of the display enter the viewers pupils.

Examples of such state-of-the-art displays include multi-view displays (sometimes rereferred to as light-field displays) and holographic displays. For example, the Looking-Glass display developed by the LookingGlass Factory uses an optical technology wherein depending on the users viewing angle a different view reaches the eyes of the viewer. To achieve this effect, video frames of the multi-view video may include a plurality of views, e.g. 45 different views of an object. This way, multi-view video can be encoded based on a standard video codec and transmitted to a display based on a standard video streaming protocol. A decoder connected to the display may decode the video frames, extract different views, e.g. twenty, from each video frame and simultaneously render the views to produce the desired holographic effect.

The more advanced multi-view or holographic displays become, the more views per view angle it can show and the larger the total viewing angle becomes. Every generation of volumetric displays may thus display more views for a larger total viewing angle than the preceding generation of displays. By generating pre-determined volumetric content based on a multi-view format (e.g. the quilt for the Looking Glass), there is a high risk that the content contains more or less views than the device can display because of the physical (optic, display panel) limitations. In addition, some multi-view displays can render multi-view video in one dimension (e.g. the Looking Glass only supports horizontal multi-view video) while others, e.g. true "holographic" multi-view displays may be capable of rendering the video in two dimensions, i.e. horizontal and vertical. Hence, different displays may support multi-view holographic effects in either one or more directions in a variety of accuracies. Furthermore, new types of volumetric displays may be designed for vertical viewing experience wherein the aspect ratio of the display is in portrait mode rather than landscape, as is the case with the new Looking Glass device called Looking Glass Portrait. Hence, the display characteristics of current and future multi-view displays and the associated proprietary data formats, such as the quilt data format for the Looking Glass device, will be of a heterogeneous nature, while at the same time the amount of data (number of views) needed to produce realistic holographic effects in different dimensions will continue to increase rapidly.

Producing segmented content for such a heterogeneous set of display devices that can be streamed on the basis of an adaptive streaming protocol, such as MPEG-DASH, will become problematic because the amount of data that needs to be stored for all current and future devices would grow exponentially. Hence, from the above, it follows that there is a need in the art for improved methods and systems for efficient streaming of multi-view video to a plurality of multi-view displays having heterogeneous device characteristics.

SUMMARY OF THE INVENTION

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the person's computer, partly on the person's computer, as a stand-alone software package, partly on the person's computer and partly on a remote computer, or entirely on the remote computer or server. In the latter scenario, the remote computer may be connected to the person's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In an aspect, the invention relates to a method of processing multi-view video data by a server. In an embodiment, the method may include receiving one or more first multi-view parameters from a client device, the one or more multi-view parameters being indicative of a first data format associated with a multi-view display device of the client device. The method may further include receiving a request for a segment sent by the client device to a content source based on a manifest file, the segment request comprising a segment resource locator identifying a first source segment comprising first multi-view video data, the segment resource locator comprising one or more second multi-view parameters indicating that the first multi-view video data are of a second data format. The method may also include generating a segment of the first data format based on the one or more first multi-view parameters, the first multi-view video data and, optionally, further multi-view video data associated with one or more further source segments. Further, the method may include transmitting the generated segment to the client device.

Thus, the method includes a server which is configured to generate segments of a specific data format on-the-fly based on source segments that are stored on a source server or, optionally, in a cache at the server. This way, the server ensures that a segment received by the client comprises multi-view video data of a data format that can be rendered by a multi-view display device associated with the client device. The segment defined in the segment request and the source segments stored at the content source are described based on resource locators e.g. URLs, URIs and/or other types of identifiers, in which information about multi-view parameters of the multi-view video is embedded. These multi-view parameters may be indicative of a certain data format that is required for rendering the multi-view data in a segment by the multi-view display associated with the client device. Thus, based on segments generated by the server in response to a segment request of a client device, a heterogeneous set of clients associated with different multi-view display devices may be efficiently provided with video segments that meet the requirements of the particular display device. This way, there is no need for the content source to store all required data formats in different bitrates, for example in the cloud. The method thus allows the use of a conventional streaming client while consuming multi-view video content that is tailored to the needs of the multi-view display. The edge server may be used in segmented streaming schemes as defined in the various HTTP adaptive streaming standards such as MPEG DASH.

In an embodiment, receiving one or more first multi-view parameters may include: receiving a request message for a manifest file from the client device, the request message comprising the one or more first multi-view parameters.

In embodiment, the request message, preferably a HTTP request message, may comprise a string, preferably a query string, comprising at least part of the or more first multi-view parameters and/or wherein the request message, preferably a HTTP request message, comprises a header, the header comprising at least part of the one or more first multi-view parameters.

In an embodiment, the manifest file may comprise segment identifiers for identifying segments comprising multi-view video data.

In an embodiment the manifest file may comprise segment resource locators for locating one or more media servers configured to stream the segments, the segment resource locators including the segment resource locator identifying the first source segment, a resource locator associated with a segment comprising one or more multi-view parameters indicative of a data format of the multi-view video data comprised in the segment.

In an embodiment, the first segment resource locator may include a string having a data format comprising one or more data fields, wherein the one or more data fields are associated with at least part of the one or more multi-view parameters respectively.

In another embodiment, the first segment resource locator comprises a path, wherein the path includes at least part of the one or more multi-view parameters; and/or wherein the first segment resource locator comprises a source segment name in which at least part of the one or more multi-view parameters are embedded.

In an embodiment, the method may comprise: parsing the segment resource locator; and, extracting the one or more second multi-view parameters from the segment resource locator.

In an embodiment, the one or more first and/or second multi-view parameters may include at least one of: a number of view angles associated with encoded pictures in a segment; a packaging format of encoded pictures in a segment; a video codec used for encoding pictures in a segment; horizontal and/or vertical orientation of the view angles associated with encoded pictures in a segment.

In an embodiment, the first multi-view video data may define an encoded representation of a set of pictures associated with a set of view angles.

In an embodiment, at least one of the one or more first multi-view parameters may be indicative of the view angles required by the multi-view display apparatus of the client.

In an embodiment, the generating a segment of the first data format may comprise: selecting a subset of pictures from the set of pictures based on the view angles required by the multi-view display apparatus, the subset of pictures being associated with a subset of view angles selected from the set of view angles; and, generating the segment of the first data format based on the subset of pictures.

In an embodiment, the first multi-view video data may define an encoded representation of a set of multi-view pictures, each multi-view picture including a grid of pictures associated with different view angles.

In an embodiment, at least one of the one or more first multi-view parameters may be indicative of the packaging format required by the multi-view display apparatus of the client.

In an embodiment, the generating a segment of the first data format may comprise: re-ordering pictures in the grid of pictures of the multi-view pictures; and, generating the segment of the first data format based on the re-ordered multi-view pictures.

In an aspect, the invention may relate to a client requesting multi-view video data by a client device from a server. In an embodiment, the method may comprise sending a request for a manifest file to the server, the request comprising one or more first multi-view parameters indicative of a first data format associated with a multi-view display device of the client device. The method may further comprise receiving a manifest file comprising segment identifiers for identifying segments comprising multi-view video data, the manifest file further comprising segment resource locators for locating one or more media servers configured to stream the segments, a resource locator associated with a segment comprising one or more multi-view parameters indicative of a second data format of the multi-view video data comprised in the segment. The method may also comprise transmitting a request for a segment to the server based on the manifest file, the segment request comprising a segment resource locator identifying a first source segment comprising first multi-view video data, the segment resource locator comprising one or more second multi-view parameters indicating that the first multi-view video data are of a second data format.

The method may also comprise receiving a segment of the first data format from the server, which is configured to generate the segment of the first data format based on the one or more first multi-view parameters and the first multi-view video data.

In an embodiment, the server may be configured as an intermediate server or an edge server.

In an embodiment, the request may be an HTTP request wherein at least part of the or more first multi-view parameters are included in a string, for example a query string, attached to the request and/or wherein at least part of the one or more first multi-view parameters are included in the header of the request.

In a further aspect, the invention may relate of a client device for requesting multi-view video data from a server. In an embodiment, the client device may comprise a computer readable storage medium having computer readable program code embodied therewith, and a processor, preferably a microprocessor, coupled to the computer readable storage medium, wherein responsive to executing the computer readable program code, the processor may be configured to perform one or more of the following executable steps: sending a request for a manifest file to the server, the request comprising one or more first multi-view parameters indicative of a first data format associated with a multi-view display device of the client device, preferably the request being an HTTP request wherein at least part of the or more first multi-view parameters are included in a string, for example a query string, attached to the request and/or wherein at least part of the one or more first multi-view parameters are included in the header of the request; receiving a manifest file comprising segment identifiers for identifying segments comprising multi-view video data, the manifest file further comprising segment resource locators for locating one or more media servers configured to stream the segments, a resource locator associated with a segment comprising one or more multi-view parameters indicative of a second data format of the multi-view video data comprised in the segment; transmitting a request for a segment to the server based on the manifest file, the segment request comprising a segment resource locator identifying a first source segment comprising first multi-view video data, the segment resource locator comprising one or more second multi-view parameters indicating that the first multi-view video data are of a second data format; and, receiving a segment of the first data format from the server, which is configured to generate the segment of the first data format based on the one or more first multi-view parameters and the first multi-view video data.

In yet a further aspect, the invention may relate to a server or a server system for processing multi-view video. The server may comprise: a computer readable storage medium having computer readable program code embodied therewith, and a processor, preferably a microprocessor, coupled to the computer readable storage medium, wherein responsive to executing the computer readable program code, the processor may be configured to perform any one of the following executable operations: receiving one or more first multi-view parameters from a client device, the one or more multi-view parameters being indicative of a first data format associated with a multi-view display device of the client device; receiving a request for a segment sent by the client device to a content source based on a manifest file, the segment request comprising a segment resource locator identifying a first source segment comprising first multi-view video data, the segment resource locator comprising one or more second multi-view parameters indicating that the first multi-view video data are of a second data format; generating a segment of the first data format based on the one or more first multi-view parameters, the first multi-view video data and, optionally, further multi-view video data associated with one or more further source segments; and, transmitting the generated segment to the client device.

In an aspect, the invention may relate to a server or a server system for processing multi-view video which is configured to perform any of the steps described in the embodiments above.

In yet a further aspect, the invention may relate to a computer-readable medium comprising transitory or non-transitory data, wherein the data may define a data structure, such as a manifest file, the data structure representing metadata defining segment identifiers for identifying segments comprising multi-view video data, the metadata further comprising segment resource locators for locating one or more media servers configured to stream the segments, a resource locator associated with a segment comprising one or more multi-view parameters indicative of a data format of the multi-view video data comprised in the segment.

In an embodiment, the segment resource locator may include a string having a data format comprising one or more data fields, wherein the one or more data fields are associated with at least part of the one or more multi-view parameters respectively.

In an embodiment, the segment resource locator may comprise a path, wherein the patch includes at least part of the one or more multi-view parameters.

In an embodiment, the segment resource locator may comprise a source segment name in which at least part of the one or more multi-view parameters are embedded.

The invention may also relate to a computer program product comprising software code portions configured for, when run in the memory of a computer, executing the method steps according to any of process steps described above.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 4 depicts a flow diagram of a method of processing multi-view video by an edge server according to an embodiment of the invention.

FIG. 9 depicts examples of resampled multi-view pictures by an edge server according to an embodiment of the invention;

DETAILED DESCRIPTION

Figure 1B:
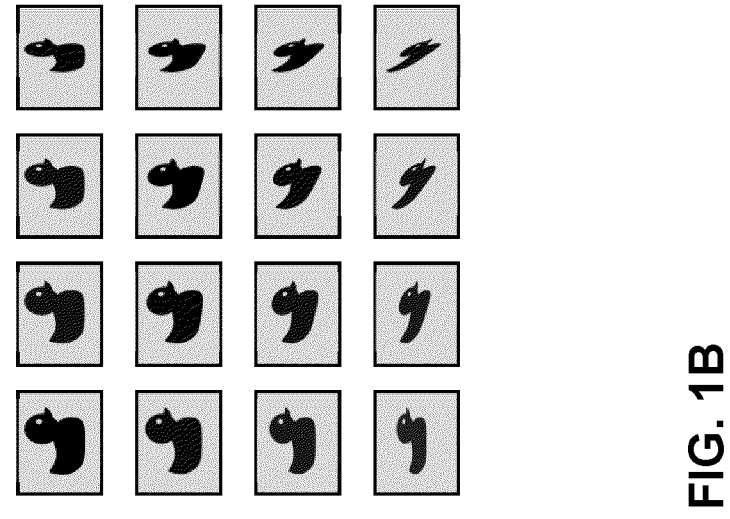
FIGS. 1A and 1B illustrate the creation of multi-view video.
Figure 1A:
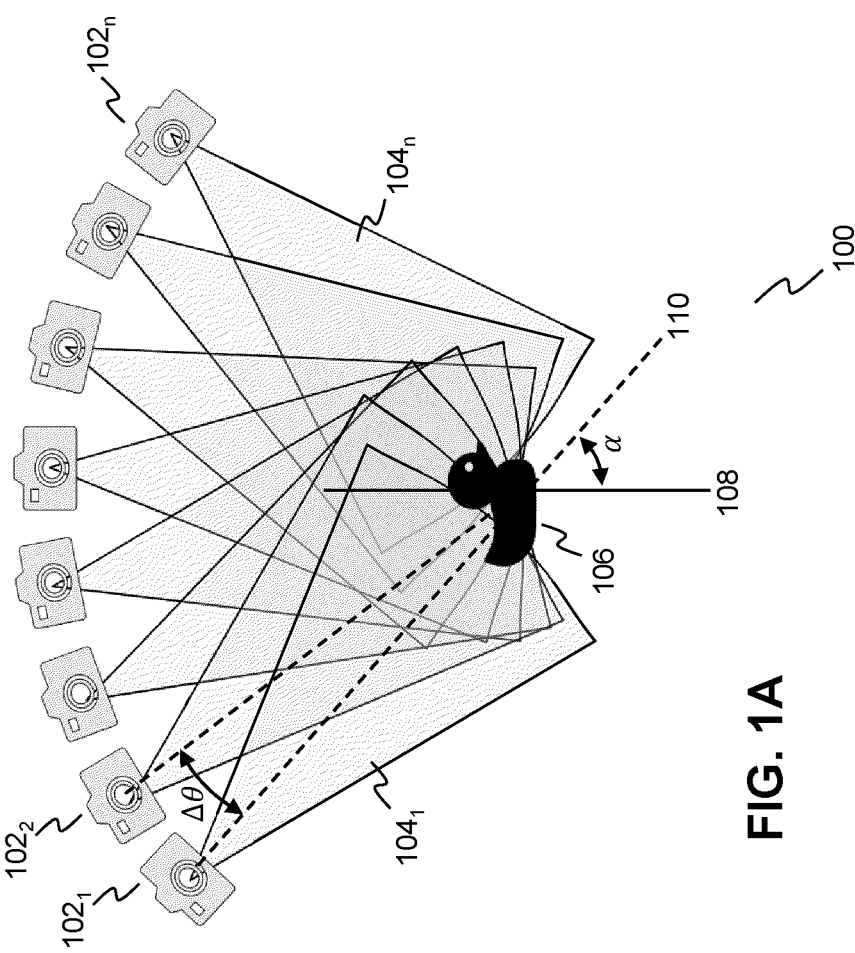

FIGS. 1A and 1B depict a schematic of a content creation system for multi-view video. As shown in FIG. 1A, a scene comprising one or more objects 106 may be captured by an array of similar camera's 102$_{1\text{-}n}$ arranged around the object. The cameras may be equally spaced around the object and centered to the object to be captured. The cameras are arranged so that the object is within the field of view (FOV) 104$_{1\text{-}n}$ of each camera, which—together with the front and back clipping plane form—the (3D) viewing frustrum of the camera. The cameras may be arranged in a curved formation around to the object. Alternatively, the cameras may be arranged in a line. In the latter case however, there may be a slight tilt on the viewing frustrum of the cameras so that the object remains in focus for all cameras despite the displacement. In addition, the set of cameras needs to be carefully configured so that all the cameras capture the scene at the same number of images per second and that each image captured by each camera is taken at the same time instance. This is to ensure that the content captured is temporally coherent. If this condition is not met, this can cause visual artefacts and a degraded volumetric effect at the rendering.

The sequence of video frames captured by each camera may represent one "view" of the object. Hence, such sequence of video frames may hereafter be referred to as a view stream or simply a view. The common element between each view, is that the views have the same focal point and field of view and associated viewing angle (i.e the angle of the field of view), which conceptually matches the center of the display. Therefore, each view can be expressed as the deviation from a reference axis, which may be referred to as the view angle $\alpha$. As shown in the figure, the view angle may be defined as the angle between the optical axis of a camera 110 that captures the pictures of a view and an axis 108 which conceptually defines the central axis of a multi-view display. This way, the view angle may be zero in case the optical axis of the camera is parallel to the central axis of the (virtual) multi-view display. The orientation of the view angle relative to the display may be defined in a suitable coordinate system.

Further, a view spacing $\Delta\theta$ may define the angular spacing between subsequent cameras—and thus—subsequent views. In order for the display to generate realistic holographic effects, the angular view spacing should be sufficiently small. Depending on the application, the array of cameras may be a one-dimensional array of cameras as e.g. illustrated in FIG. 1A. In that case, views are available for different horizontal view angles. However, in other embodiments, the array of cameras may be a 2D array of cameras thereby not only generating side views of an object, but also views from 'above' and 'below'. In that case, the content creating system may generate a 2D grid of views as shown in FIG. 1B wherein each view may be associated with a particular (3D) view angle.

Figure 2:
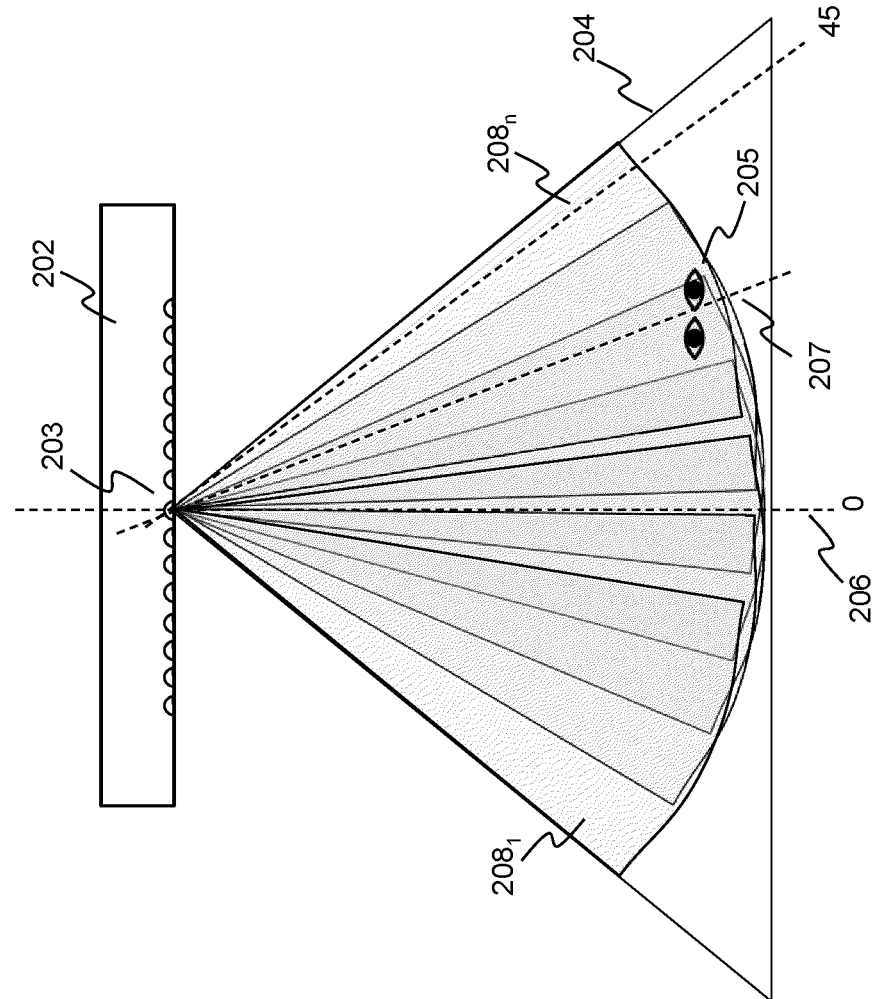
FIG. 2 illustrates a schematic of a multi-view display rendering multi-view video.

State of the art multi-view displays include special optics that display different visual information depending on the viewer's eye position and gaze. In particular, such displays are capable of simultaneously rendering multiple views so that realistic "holographic" effects may be achieved. To that end, the angular spacing of the different views should be small enough so that multiple rays emanating from the same screen point of the display enter the viewer's pupils. This is schematically shown in FIG. 2, which depicts a multi-view display apparatus comprising display screen 202 including screen points 203, pixel structures, which are configured to transmit different optical information associated with different views in different view angles.

For example, the figure depicts a pixel structure 203 at the central axis 206 of the display simultaneously emitting light of many different views 208$_{1\text{-}n}$ in different view angles away from the screen. The envelope 204 of these views may define the field of view of the pixel structure, i.e. the area in which light emanating from the pixel structure is visible. All the pixel structures of the screen may form a display which emits different views at different view angles. The field of view of a pixel structure may be hardware dependent and may vary depending on the display technique that is used. Examples of such state-of-the-art displays include multi-view displays (sometimes rereferred to as light-field displays) and holographic displays. For example, the Looking-Glass display developed by the LookingGlass Factory uses an optical technology wherein depending on the user's viewing angle a different view reaches the eyes of the viewer.

Thus, a viewer 205 positioned at a predetermined angular position relative to the central axis will receive light from a different set of views than a viewer that is positioned at the central axis. Here, the angular position of the viewer may be defined as the angle between the central axis 206 and a viewer axis 207 representing an imaginary line which runs through the position of the viewer and the position of the pixel structure at the central axis of the display. This way, a viewer which is positioned away from the central axis will be able to see (part of) the side of an object, while the viewer at the central axis is not able to see that side. In practice, the number of simultaneously emitted views may be significantly larger than the number of views schematically depicted in FIG. 2. As shown in this picture, the visual information seen by the viewer 205 will consist of a subset of different views wherein the main part of the visual information will originate from views having view angles around the angular position of the viewer. The viewer will not receive any visual information from views having a view angle substantially larger or smaller than the vantage point, i.e. the angular position of the viewer. In other words, views that have a small angular distance with respect to the viewer's vantage point will be visible while views that have a large angular distance with respect to the angular position of the user are not visible to the viewer.

Figures 3A, 3B:
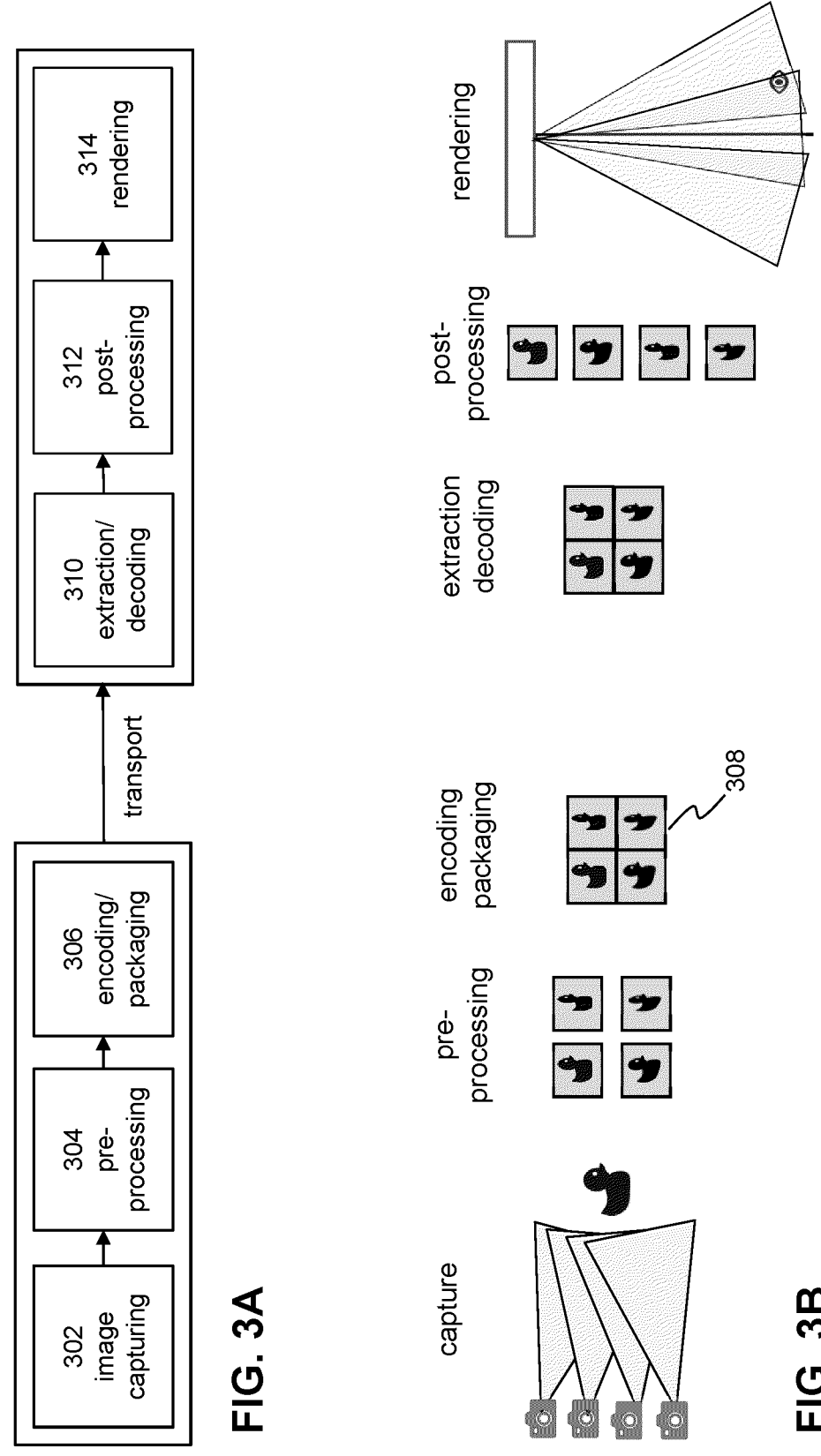
FIGS. 3A and 3B depicts a data processing pipeline for multi-view video.

FIGS. 3A and 3B schematically depict a full data processing pipeline for multi-view video. The process may include the step 302 of image capturing of one or more objects from different view angles based on an array of cameras as depicted e.g. described with reference to FIG. 1. It is noted that the video may relate to real scenes or virtual scenes (scenes for virtual reality or the like). Views associated with such virtual content may be generated based on a set of virtual cameras, in a similar way views based on real scenes are created.

In step 304 raw frames of the cameras may be processed to meet the multi-view content requirements. Examples of pre-processing that might be applied on this step include cropping, scaling, filtering etc. Depending on the targeted format(s) after a per-frame visual pre-processing step further a format-specific pre-processing step may be applied. For example, in an embodiment, pictures of different views of one time instance are encoded in one frame, the pictures may be stitched together and metadata may be generated describing at which position in the frame, a particular view is located.

In step 306, the composed video frames including the views may be encoded based on a video codec. Depending on the application, a different codec may be used, e.g. a traditional codec AVC, HEVC, AV1 or a multi-view codec such as the Multiview Video Coding (MVC) which is based the MPEG-4 part 10 AVC/H.264 codec. MVC is a codec standard for video compression that allows for the efficient encoding of video sequences captured simultaneously from multiple camera angles in a single video stream. One application is stereoscopic content, i.e. 2 views, (for 3D TV) but MVC also addresses multi-view content, i.e. more than 2 views. The algorithm uses a certain view as a base view which can be used to further predict the other views with techniques similar to inter-frame prediction.

Similarly, MV-HEVC is a video coding standard based on MPEG-H part 2/H.265 which allows for the efficient encoding of video sequences captured simultaneously from multiple camera angles in a single video stream. Further, a separate HEVC extension for stereoscopic content exists which is referred to as 3D-HEVC. Both extensions are published under the same specification number ISO/IEC 23008-2, i.e. MPEG-H part 2/H.265. Both standards are based on inter-frames dependencies. This includes dependencies in the time (as are traditional coding schemes) and between frames of different views. The encoded video may be packaged into a suitable transport format or file container, e.g. an MPEG transport format (MPEG-TS) or an ISO Base Media File Format (ISOBMFF).

After transport, the encoded video data may be extracted from the transport containers and decoded by a decoder (step 310). In some cases, the decoded frames may be post-processed based on the metadata, which may be received by the decoder in-band and/or out-of-band. For example, e.g. cropping operations may be needed to extract pictures from different views to form the decoded video frames. Finally, the pictures of the different views may be rendered by the multi-view display, which will simultaneously render the different views.

To achieve realistic holographic video rendering, the angular resolution of the views needs to be substantial, thereby requiring generation, encoding, transportation (streaming), decoding and simultaneous play-out of multi-view video comprising a large number of views. Streaming of such multi-view content will provide substantial challenges in terms of bandwidth utilisation and quality of service, because the human eye is very sensitive to errors during the rendering of multi-view video. Hence, a streaming scheme is needed that provides efficient data streaming while ensuring that the sufficient views are streamed so that the holographic effect can be created.

Additionally, the display characteristics of current and future multi-view displays and the associated proprietary data formats, such as the quilt data format for the Looking Glass device, will be of a heterogeneous nature, while at the same time the amount of data (views) needed to produce realistic holographic effects in different dimensions will increase. Producing segmented content for such heterogeneous set of display devices that can be streamed on the basis of an adaptive streaming protocol, such as MPEG-DASH, is not a scalable solution for this problem because the amount of data that needs to be stored for all current and future devices would grow exponentially. Additionally, such approach would also not address the problem of the lack of interoperability between the different multi-view displays.

The embodiments in this application address these problems by introducing an adaptive streaming scheme based on conventional video streaming clients. To that end, a client device may be configured to request a targeted manifest file from the network based on information about the display characteristics of the multi-view display associated with the client device. The targeted manifest file may define segments comprising multi-view video that may meet at least part of the display characteristics. Further, the client device may communicate via a server, e.g. an edge server or an intermediate server, with a content source, for example a content distribution network (CDN), that is configured to deliver multi-view video in the form of source segments via the server to the client device. The server may be configured to cache source segments, interpret client requests sent to the content source and perform on-the-fly re-sampling operations on one or more source segments in order to generate a segment that is requested by a client device.

A client device may send information about its display characteristics, i.e. information regarding the data format of the multi-view data required by the multi-view display, to the server. This may be realized by the client device sending one or more multi-view parameters in a request for a manifest file to a content source, wherein the one or more multi-view parameters are indicative of the data format that the multi-view display devices uses. Thus, in response to a manifest file, the server will receive information about the data format of the multi-view video that is needed and the client device will receive a targeted manifest file which the client device can use to request the desired content based on available resources (decoding, bandwidth, battery, CPU, etc.). To this end, the client device may use conventional content selection and bandwidth adaptation logic known from known adaptive streaming protocols such as MPEG DASH.

The targeted manifest file may comprise resource locators, URLs, for segments in which one or more multi-view parameters are embedded which are indicative of the data format of the multi-view video data contained in the source segments stored at the content source or, optionally, at a cache of the server. Typically, the data format of the multi-view video data of the source segments differs from the data format of the multi-view video data that is needed by the client device. Hence, in that case, the server may use the information about the data format the requested segment and the data format of stored source segments that are available to generate segment as requested by the client device. During the segment request process, a client device may remain unaware of the information that is part of the segment URLs. This information is used by the server so that it can determine a segment that is requested by the client device. This way, the segment requests logic of conventional streaming client devices, such as DASH streaming devices, can be used.

FIG. 4 depicts a flow diagram of a method of processing multi-view video by an edge server according to an embodiment of the invention. As shown in the figure, the method may start with a step 402, wherein a server, e.g. an edge server or an intermediate server receives one or more first multi-view parameters from a client device, wherein the one or more multi-view parameters indicating that a multi-view display device of the client device requires multi-view data of a first data format. The client device may send this information when it sends a request for a manifest file to a content source. This way, the server is aware that the client device needs a multi-view data of a specific data format.

In a further step 404, the server may receive a request for a segment sent by the client device to a content source based on a manifest file. Such manifest file may include segment identifiers identifying source segment comprising multi-view video data and resource locators for locating the source segments. Hence, the segment request will comprise a segment resource locator identifying a first source segment comprising first multi-view video data. The segment resource locator may comprise one or more second multi-view parameters indicating that the first multi-view video data are of a second data format. Hence, the segment resource locator may be formatted so that it comprises information about the data format of the segment it is associated with.

Then, the server may generate a segment of the first data format based on the one or more first multi-view parameters and the first multi-view video data (step 406). In some embodiments, the segment may be generated on additional multi-view video associated with one or more further source segments. Hence, the server may modify the format of multi-view video data of a source segment and/or creating a new segment based on the multi-view video data identified in the segment request and, optionally, based on multi-view video data of additional source segments. Thereafter, the edge server may transmit the created segment to the client device (step 408).

Thus, the method includes a server positioned between a client device and a content source which is configured to generate segments of a specific data format on-the-fly based on source segment that are stored on a source server or, optionally, in a cache at the server. This way, the server ensures that the segment received by the client comprises multi-view video data of a data format can be rendered by a multi-view display device associated with the client device. The segment defined in the segment request and the source segments stored at the content source are described based on resource locators e.g. URLs, URIs and/or other types of identifiers, in which information about multi-view parameters of the multi-view video is embedded. These multi-view parameters are indicative of a certain data format. Based on segments generated by the server in response to a segment request of a client device, a heterogeneous set of clients associated with different multi-view display devices may be efficiently provided with video segments that meet the requirements of the particular display device. This way, there is no need for the content source to store all required data formats in different bitrates, for example in the cloud. The method thus allows the use of a conventional streaming client while consuming multi-view video content that is tailored to the needs of the multi-view display. The edge server may be used in segmented streaming schemes as defined in the various HTTP adaptive streaming standards such as MPEG DASH.

The invention and its embodiments are described hereunder in more detail with references to the figures. The embodiments relate to a client device requesting multi-view video which meets the characteristics and/or specifications of a multi-view display device. Here, a multi-view display device may include a screen comprising multi-view pixel structures configured to transmit different visual information in different directions relative to the central (optical) axis of the display device. As described with reference to FIG. 1-3, a multi-view display device may have a physical space in which a viewer is able to view the multi-view video rendered by the display. This area may be referred to the field of view (FoV) of the multi-view display device. The field of view may be regarded as a "window" as the viewing experience is similar to looking through a window pane. In particular, the window defines the space in which a viewer in front of the display will be able to see the holographic effects produced by the multi-view display. Multi-view parameters associated with the characteristics of the multi-view display and/or characteristics of multi-view video data that may be used during streaming, processing and rendering of multi-view video may include:

User-Window-Angle: an angle at which a window of a display apparatus is positioned relative to a viewer.

User-Angles-In-View: the number of view angles a pixel structure of a multi-view is capable of transmitting visual information Window Dimensions: physical size of the screen of the display device;

Total viewing angle: angle associated with the field of view of pixel structure of the display device;

View Distance: a distance between a viewer and the display device at which a holographic effect is visible View format: format describing how pictures of different view angles of the multi-view video are spatially arranged in a so-called multi-view picture.

Figures 5, 6:
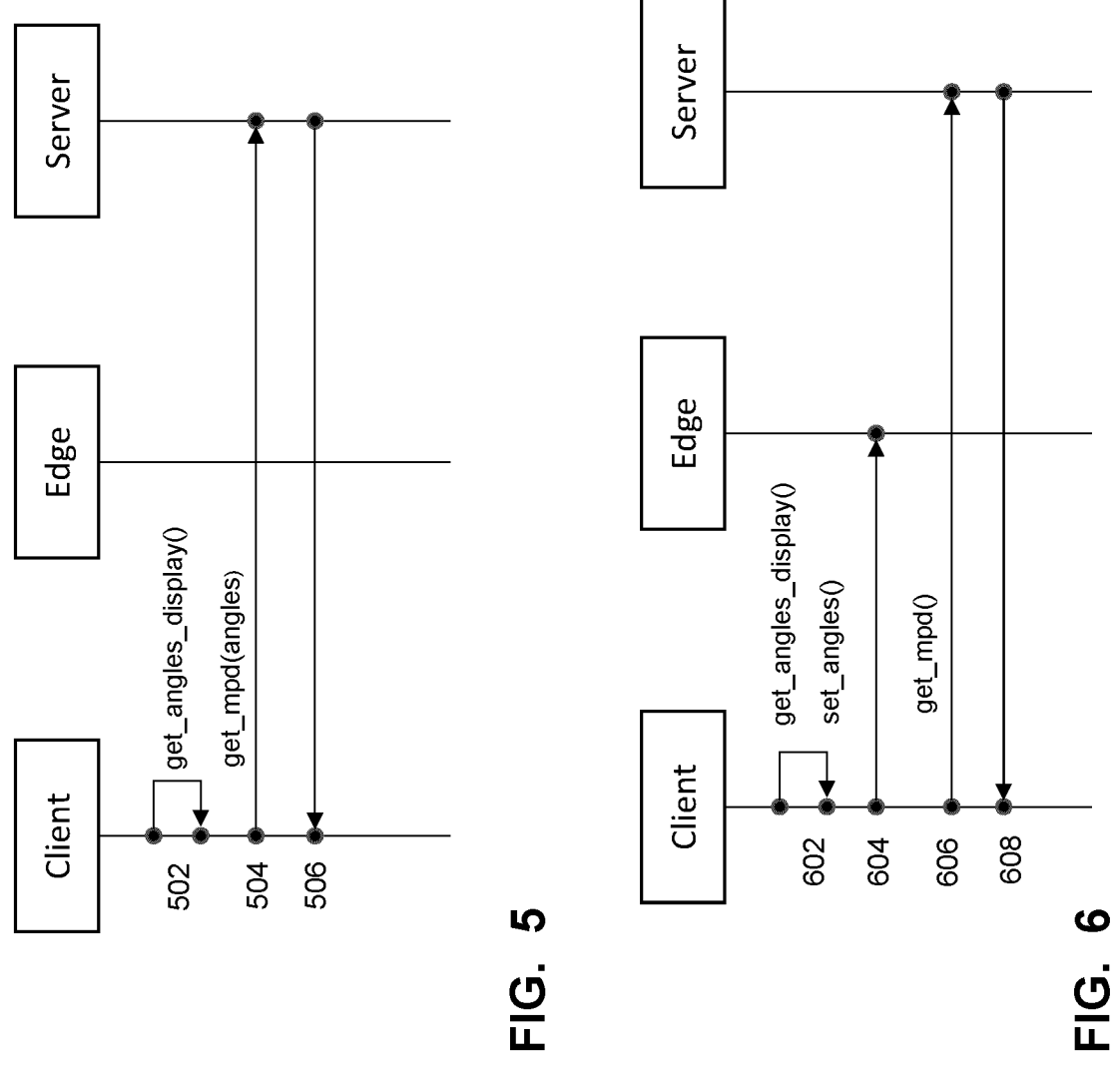
FIG. 5 depicts a process of requesting a targeted manifest file according to an embodiment of the invention.
FIG. 6 depicts a process of requesting a targeted manifest file according to an embodiment of the invention.

As most of the display characteristics and data format used by a multi-view display are static, this information may be sent to the content delivery network before the content is actually requested by a client device. An example of such process is depicted in FIG. 5. In particular, this figure illustrates the process of a client device sending a request for a manifest file that is associated with a certain multi-view video. The process may include the client device determining or receiving one or more display characteristics of the multi-view display device and/or data formats used by the multi-view display device (step 502). For example, the information may include the number of view angles at which the display can render multi-view video. Based on this information, the client device may construct a request message that is transmitted to a content source (step 504), e.g. a media server that may be part of a content delivery network. The request may include a content identifier identifying the multi-view video and information about the display characteristics, which may be inserted as one or more multi-view parameters values, e.g. a string of parameter values, into the request message. Hence, the one or more multi-view parameters are indicative of a data format of multi-view video data that is required by the multi-view display.

In an embodiment, the request message may be an HTTP request message such as a HTTP GET request message for requesting a manifest file. The server may receive the request message, parse the information in the message and identify multi-view video stored at the server that matches the information in the request. Based on the identified multi-view video, the media server constructs a so-called targeted manifest file that defines multi-view video that at least partly meets the information on the display characteristics that was sent in the request to the media server. The manifest file may define video segments, e.g. in the form of resource locators, e.g. URLs, identifying video segments comprising multi-view video data and locations for requesting the video segments. The thus generated targeted manifest file may be sent by the server to the client device (step 506).

In an embodiment, a request for a targeted manifest file may be implemented as a HTTP GET request for a media presentation description MPD. In an embodiment, the information on the display characteristics may be part of one or more query strings or HTTP headers. For example, an HTTP request message may include the following string of parameters:

GET server.com/movie.mpd?view_spacing=5&viewing_angle=60&dimension=horizontal may define a message for a particular MPD of a multi-view video "movie", which needs to be rendered based on a multi-view display device that is capable of rendering views having a view spacing of 5 degrees or a total viewing angle (the angle associated with the FOV) of 60 degrees in the horizontal direction only. Similarly, a request message comprising the following string of parameters:

GET server.com/movie.mpd?view_spacing=10,5& viewing_angle=40,
60&dimension=vertical,horizontal may define a multi-view display device capable of rendering views having a vertical view spacing of 10 degrees vertical and 5 horizontally for a total viewing angle of 40 degrees vertical and 60 degrees horizontal.

In another embodiment, a request for a targeted manifest file may be implemented as a HTTP GET request wherein the information on the display characteristics may be inserted in the header of the HTTP message. For example, an HTTP request message may include the following parameter in the HTTP header:

GET server.com/movie.mpd
X-MPD-Volumetric-View-spacing=5
X-MPD-Volumetric-Viewing-angle=60
X-MPD-Volumetric-Dimension=horizontal This message may define a request for a manifest file for a multi-view display device having horizontal view spacing of 5 degrees and a total horizontal viewing angle of 60 degrees.

In a further embodiment, instead of the client device constructing a request for a manifest file that includes information on the display characteristics, the client device may pre-announce the display characteristics (or capabilities) to an edge server, which is configured to intercept a request message and modify it to form a request message for a targeted manifest file comprising information about the display characteristics. An example of such process is depicted in FIG. 6. As shown in this figure, the process may start with a client device determining or receiving one or more display characteristics of the multi-view display (step 602). For example, the information may include the number of view angles at which the display can render multi-view video. The client device may send this information to an edge server (step 604), which may store this information together with a client identifier on a storage medium.

Thereafter, the client device may send a request message for a manifest file via the edge server to the content source, also here and elsewhere referred to as the media server (step 606). When the edge server receives the request message from the client device, it may use the client identifier in the request message to determine stored display characteristics associated with the client device. Then, it may modify or rewrite the request message into a request message for a targeted manifest file comprising information about the display characteristics, e.g. in the form of a query string or parameters in the header of the request message. Thereafter, the request message for a targeted manifest file may be sent to the content source. Thereafter, based on the identified multi-view video, the media server may construct a targeted manifest file that defines multi-view video that meets the information on the display characteristics that was sent in the request to the media server (in a similar way as described with reference to FIG. 5). The thus generated targeted manifest file may be sent by the media server to the client device (step 608).

It is submitted that the process of FIG. 6 is only one non-limiting example of providing a target manifest file to the client device. For example, in further embodiments, the media server may send metadata, including resource locators and other relevant parameters about available segments of a multi-view video. Then, based on these metadata and the information on the display characteristics provided by the client device, the edge server may construct a targeted manifest file and send the targeted manifest file to the client device.

A targeted manifest file may define segments comprising multi-view video data that are available to the client for a particular multi-view display. Hence, more segments may be available on the media server, but these segments would not be suitable for rendering on the multi-view display associated with the client device. These segments are therefore not included in the manifest file.

Source segments in the targeted manifest file may be identified based on resource locators that may have a predetermined data format. For example, a segment URL defined in a targeted manifest file may have the following format:

'http://server.com/movie/
X180_9_4096x2160_50_90_horizontal_5 Mb_1.mp4'

Hence, a source segment URL may define a predetermined segment associated with a multi-view video title "movie" that is stored with the content source, e.g. a CDN, wherein the source segment URL may define a structured string comprising specific parameters that provide information on the multi-view segment. The structured string may be parsed by the edge server to derive the following multi-view parameters:

X=180
Angles-in-View=9
Window-Size: 4096x2160
Distance: 50 cm
Tilt: 90
Format: Horizontal Alternatively, different multi-view parameters may be concatenated using the path symbol separator '/' as follows:

'http://server.com/movie/X180/9/4096x2160/50/90/horizontal/5 Mb_1.mp4'

Hence, the multi-view parameters associated with the characteristics of the multi-view display and/or multi-view video format may be embedded in the URLs defining the source segments. These parameters may be used later by the edge to either request source segments from the content source or to generate segments based on (cached) source segments.

It is noted that not all multi-view parameters need to be in the source segment URL. At least part of the multi-view parameters may be part of a path defined in the URL, part of query string, part of a segment name, part of an obfuscated and/or encrypted and/or signed element in the URL (e.g. query string parameter) or any other places in the URL.

Other client devices associated with multi-view displays that have the same display capabilities may also use at least a part of the source segments. Therefore, during streaming these source segments may be cached by the edge server. Identical source segments should be addressed based on the same URL so that HTTP cache functionality can be used for different device types. When two source segments are not identical but do share some views in common, the edge server may extract those views from a cached source segment and repackage the views into a segment that is requested by a client device. Those operations will be described below in more detail.

At this point, the client device has received a traditional manifest file (MPD in case of DASH) defining segments comprising multi-view video data that are suitable for rendering the display characteristics of the device. The source URLs that have been inserted in the targeted manifest file are thus pointing to source segments comprising multi-view video that meet the characteristics of the display device. In addition, the source URLs also contain meaningful information about the content characteristics in terms of multi-view parameters such as: number of views, view angles, etc. This information can be parsed by the edge server, which—on the basis of the parsed multi-view parameters—can decide to create or modify segments based on existing source segments. The scheme allows the client device to be a conventional streaming client, which does not have to parse this specific information in the source URLs, but simply uses these URLs to request segments. Thus, based on the targeted manifest file, the client device may construct conventional segment requests based on the available resource, decoding capabilities, user preferences, etc., and then send those requests in the network to the destination server.

The resource locators in the targeted manifest file may comprise information about the type and format of the source segments. This information may be parsed by the edge server, which either may be configured as a server that is visible to the client device or that may be configured to intercept requests of the client device that are transmitted to the network. Based on the parsed information, the edge server may take appropriate action. For example, based on the parsed information, the edge server may look if a requested source segment is available in the cache of the edge server. Alternatively, the edge server may generate a segment based on the segment request of the client device.

Because segment requests for particular source segments may occur frequently in a certain period or geographical area, the edge server may be configured to cache these segments. Additionally, a source segment may be used for generating several requested segments. For instance, a certain view may be used for several generated segments. Therefore, the chance is high that certain source content would be reused by the edge server for the generation of the segments. Therefore, the caching functionality may save processing time, network resource and processing power. Thus, if the edge server is provided with caching capabilities, it may verify whether a certain source segment is already available on the edge storage system. If it is, it can continue with the segment generation process, if not it may request the source segment from the content source.

Figure 7:
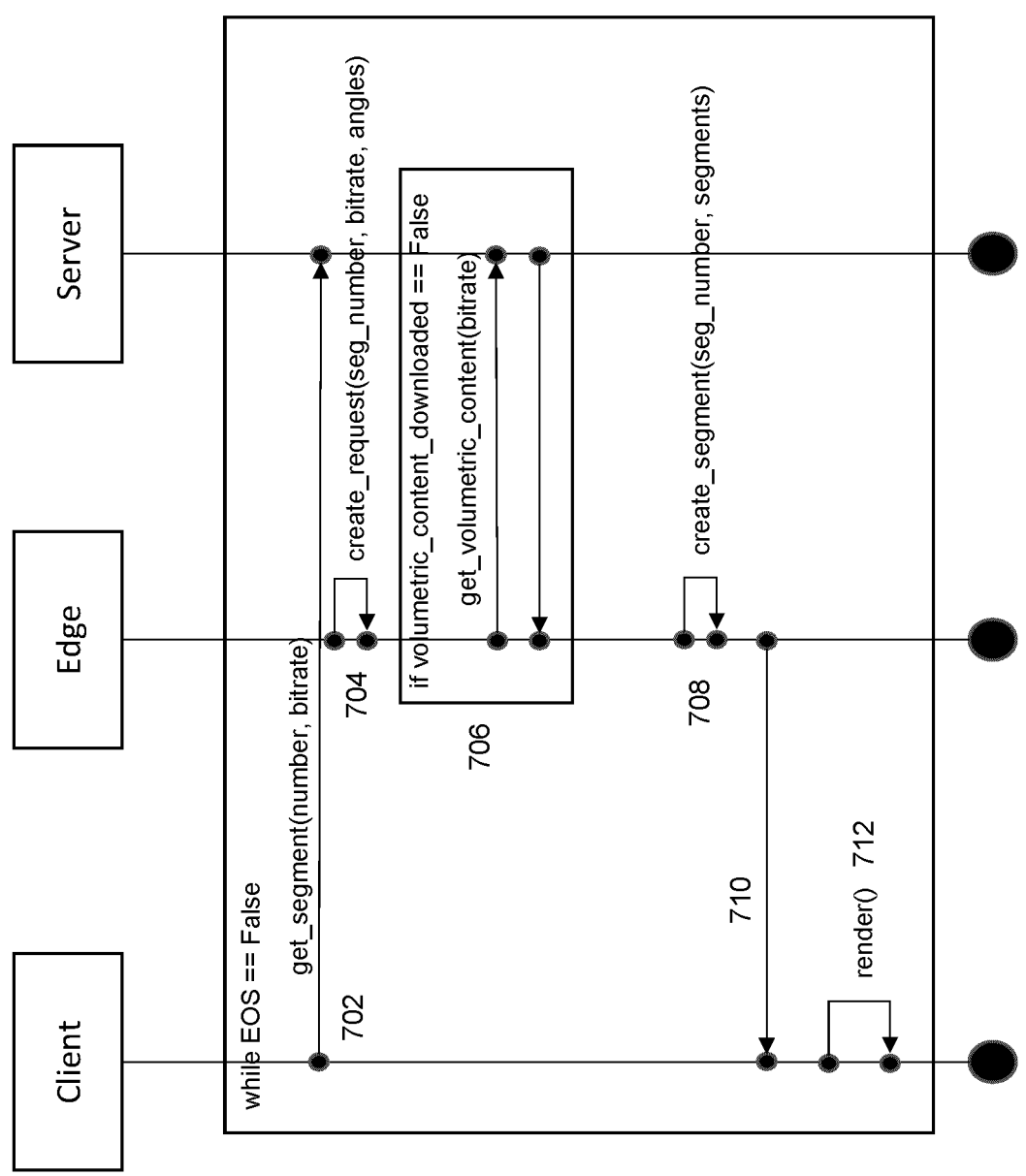
FIG. 7 depicts a process of generating a segment for a client device by an edge server according to an embodiment of the invention.

An example of the segment generation by the edge server that has a caching function is depicted in FIG. 7. As shown in this figure, the process may start with a client device requesting a segment associated with a certain segment identification number, bitrate and a predetermined number of views associated with a set of view angles wherein the multi-view pictures defining the multi-view video data have a predetermined packaging format that is required for rendering the multi-view video data by the multi-view display device (step 702). When the server receives or intercepts the request, it may use the URL of the segment in the segment request to determine if the requested segment is stored in the cache. If it the requested segment is cached, the edge server may send the requested segment directly to the client device (step 710). If the edge server determines that the cache does not comprise an identical segment, the edge device may use the multi-view parameters in the URL of the requested segment and the multi-view parameters derived from resource locators of cached source segments to determine if the cache comprises one or more source segments that can be used to generate the requested segment. For example, the edge server may look for a cached source segment (or a plurality of cached source segments) that comprises the predetermined number of views, possibly in a different packaging format. If edge server determines identifies such cached segment, the edge server may generate the requested segment based on the identified cached segment (step 704) and send the requested segment to the client device.

The requested segment may be generated on the basis of a cached segment in different ways. For example, if the views of the segment requested by the client form a subset of a set of views contained by an identified cached segment, the edge server may decode coded multi-view video data of the identified segment into pictures comprising the set of view angles, select decoded pictures that are associated with view angles of the subset, i.e. pictures with view angles as requested by the client device, encode the selected pictures into encoded pictures that have a packaging format requested by the client device and package the encoded multi-view video data into a video segment as requested by the client device, which is subsequently send to the client device.

In case the edge server does not have a cached source segment that includes the predetermined number of views, it may create a segment request for requesting a source segment from the content source (step 706) wherein the requested source segment is suitable for generating a segment that is requested by the client device. For example, the edge server may request one or more segments comprising a set of views that include the subset of views that are requested by the client device. The content source may use the multi-view parameters in the URL of the segment request of the edge server and the metadata associated with stored source segments to determine one or more source segments that can be used for generating the requested segment. After reception of the one or more source segments from the content source, the edge server may generate the requested segment in the same way as described above with reference to step 704.

It is noted that the caching capability of the edge server as described with reference to FIG. 7 differs from a conventional HTTP server with caching capabilities, wherein a response to a requested segment (identified by the URL) is only successful in case the URL of the requested segment is identical to the cached segment. Instead, the server may use the multi-view parameters in the URL of the requested segment and the multi-view parameters in the URLs of cached segments to determine if the requested segment can be generated based on one or more segments stored in the cache. This way, it is avoided that the edge server will request the same source segments multiple times.

Figure 8:
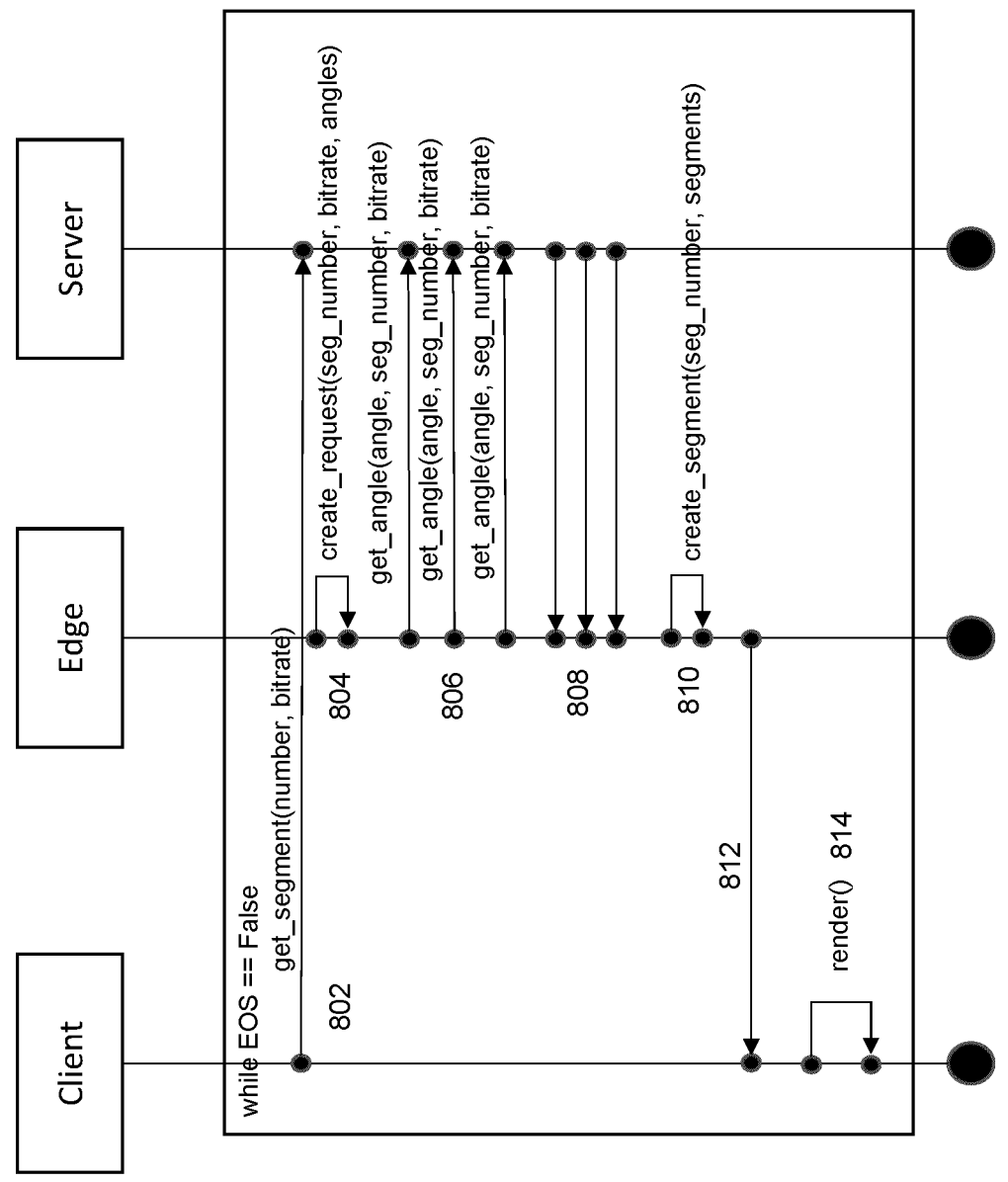
FIG. 8 depicts a process of generating a segment for a client device by an edge server according to an embodiment of the invention.

In a further embodiment, the server may generate a request segment based on one or more source segments, without segment caching. An example of the segment generation by the edge server that has a caching function is depicted in FIG. 8. As shown in this figure, the process may start with a client device requesting a segment associated with a certain segment identification number, bitrate and a predetermined number of views associated with a set of view angles wherein the multi-view pictures defining the multi-view video data have a predetermined packaging format that is required for rendering the multi-view video data by the multi-view display device (step 802). When the server receives or intercepts the request, it may use the multi-view parameters in the URL of the segment in the segment request to create one or more segment requests for requesting one or more source segments that can be used by the edge server to generate the segment that is requested by the client device (step 804).

Here, each URL of the one or more segment request that are created by the edge server may include multi-view parameters, e.g. a segment identifier, bitrate, a number of view angles, etc., so that the content source can select one or more source segments that comply at least partly with the requested multi-view parameters. The one or more created segment requests may be sent by the edge server to the content sources, which in response may send one or more source segments back to the edge server (step 806 and 808). The edge server may subsequently use the one or more source segments to construct the requested segment (step 810) in a similar manner as described with reference to step 708 of FIG. 7. The constructed segment may be sent to the client device which may process the multi-view video data in the segment so that the video data can be rendered by the multi-view display associated with the client device (steps 812 and 814).

The creation of the requested segment based on the one or more source segments as described above with reference to FIGS. 7 and 8, may be realized in different ways. In particular, the generation of the quested segment may be based on re-sampling of the multi-view video data of the one or more source segments. Re-sampling of the video data in the segments may be executed in the decoded domain or in the coded domain.

Re-sampling in the decoded domain may include decoding the multi-view video data of a source segment into pictures associated with a set of different view angles, processing the pictures to form pictures of a desired format, wherein the pictures are associated with view angles as requested by the client device. The processed pictures may be encoded and packaged into a segment of a desired segment format, e.g. a DASH segment based on ISOBMFF.

Resampling in the coded domain may include parsing a bitstream representing the multi-view video data of a source segment, selecting parts of the bitstream, e.g. one or more NAL units, comprising encoded video data associated with views as requested by the client device, constructing a bitstream based on the selected parts of the bitstream and packaging the bitstream into a segment of a desired data format. Resampling in the coded domain thus includes rewriting a bit streaming representing a source segment by parsing NAL units in the bitstream, selecting NAL units comprising video data associated with one or more desired view angles and ordering the selected NAL units to form a modified bitstream representing the segment requested by the client device. In further embodiment, the bitstream rewriting may be based on a plurality of bitstreams, each comprising a source segment, selecting NAL units from the plurality of bitstreams and combining the selected NAL units into a modified bitstream representing the segment requested by the client device. Bitstream rewriting has the advantage that decoding and encoding of the multi-view video data is not needed.

FIG. 9 illustrates the above-described resampling process for a particular multi-view picture format, e.g. the so-called quilt format for the Looking Glass device. Depending on the type of client the requested format of angles in a quilt might differ. For example, as shown in FIG. 9A, a source segment may include a sequence of encoded multi-view pictures, wherein each multi-view picture 902 is formatted in accordance with a grid, wherein each grid element is associated with a picture 904 of a particular view angle. The pictures may be spatially ordered in the grid based on the view angle. For example, picture 1 in the upper left corner relates to a picture with the smallest view angle and picture 9 in the lower right corner relates to a picture with the largest view angle. Further, the view angle of the pictures may be ordered horizontally: pictures 1-3 from the first (upper) row of the gird, followed by pictures 4-6 of the second (middle) row and pictures 7-9 of the third (lower) row. An example of such picture order is illustrated in FIG. 1B.

This particular multi-picture format may be modified by modifying the order of the pictures in the grid as e.g. shown in FIG. 9B, wherein the pictures are ordered vertically, based on columns of the grid starting with pictures 1-3 of the first column, pictures 4-6 of the second column, etc. For future Looking Glass device more view angles may be supported at a higher resolution than the earlier ones as e.g. shown by the multi-picture format of FIG. 9C or a multi-view format based on pictures with different resolutions as depicted in FIG. 9D. Multi-view pictures having such new multi-view picture format may be created based on existing multi-view pictures, for example four multi-view pictures of the format illustrated in FIG. 9A. The creation of a sequence of such multi-view pictures may be based on resampling schemes in the coded or decoded domain as described above. Thus, a new segment comprising multi-view data of a certain multi-view format can be formed based on pictures in one or more source segments. Resampling operations may include:

changing the number of views in the source segment(s)
   changing the position of the views in the source
      segment(s) (different view angles)
   adding a view that is missing in the source segment(s)
   the source segment(s) comprise views for horizontal and
      vertical view angles, but the requested segment only
      horizontal view angles;
   the views of the requested segment require some views to
      be in a higher quality (e.g. central views) compared to
      other views (e.g. peripheral views)
   source content is created for an optimum viewing expe-
      rience at a distance different from the client device is
      made for (mobile device vs TV set type of device)

Figure 10:
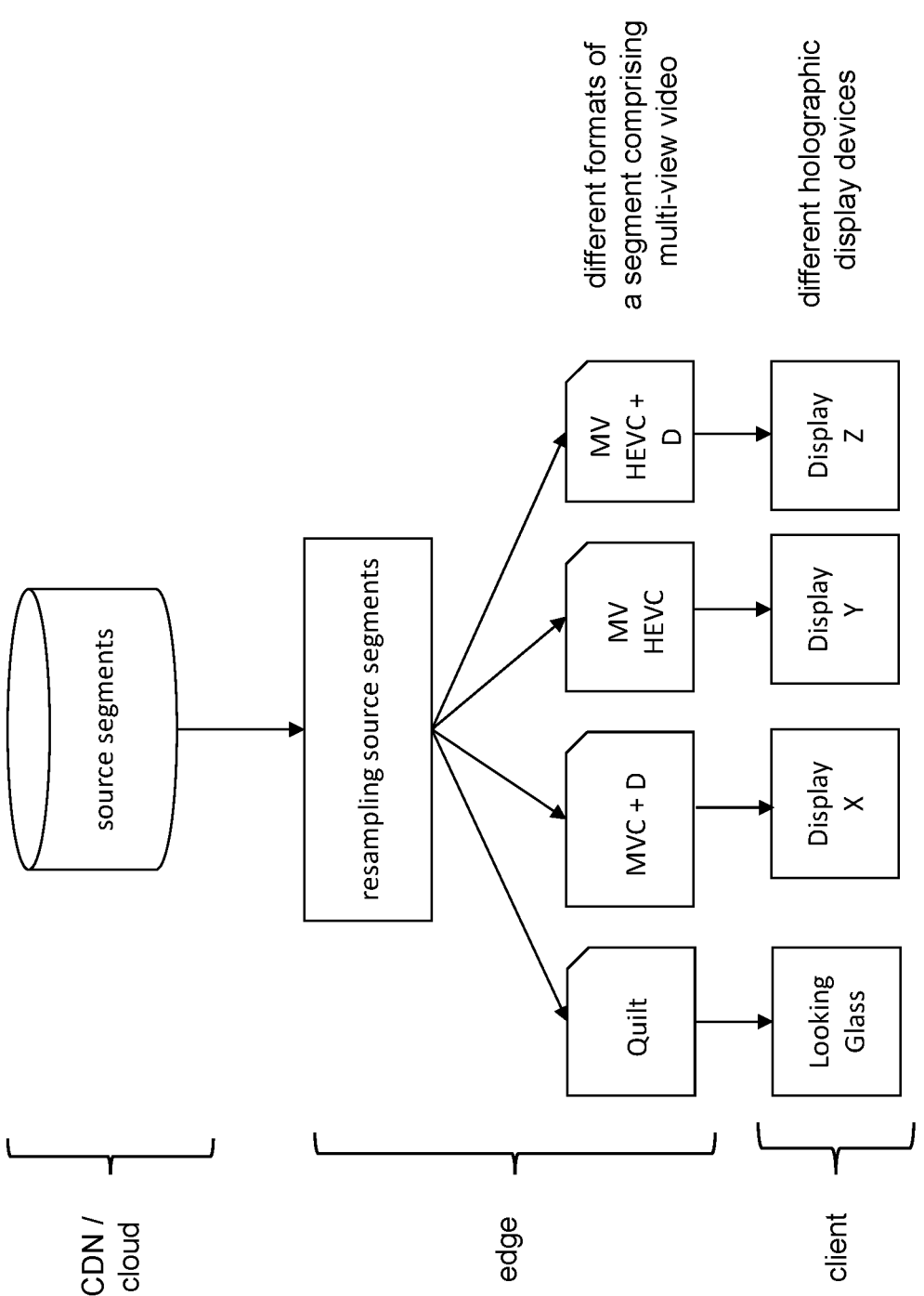
FIG. 10 depicts a schematic illustrating the process of resampling source segments according to an embodiment of the invention.

FIG. 10 illustrates a schematic illustrating the use of the edge server for resampling source segments in response to segment requests of a client device, wherein the segment defined in the segment request and the source segments stored at the content sources are described based on URLs in which information about multi-view parameters of the multi-view video is embedded. Based on the resampling of source segments by the edge server, a heterogeneous set of clients associated with different multi-view display devices may be efficiently provided with video segments that meet the requirements of the particular display device, without the need for the content source to store all required data formats in different bitrates in the cloud.

The resampling process may include various operations to achieve reformatting of part of the multi-view video data of a source segment. For example, in an embodiment, pictures associated with new view angles may not only achieved by combining pictures associated with different view angles from different source segments, but pictures with new view angles may also be created by using interpolation or synthesizing techniques. Thus based on two pictures associated with two adjacent view angles, a new picture with an intermediate view angle may be created based on view interpolation as described for instance in the article by Chen et al. "*View interpolation for image synthesis.*" Proceedings of the 20th annual conference on Computer graphics and interactive techniques. 1993.

In a further embodiment, resampling operations may be executed that are based on the view angle. For example, pictures associated with different view angles (and one time instance) may be transformed differently based on their view angle and certain conditions. For instance, a set pictures of the same scene may be resampled in such way that the peripheral views (large view angles away from the central axis of the display device) are of a lower quality than the central view (small view angle close to the central axis of the display device). This can be the case that central views are more likely to be viewed such that devices will be manufactured to provide a better view quality around the central position of the screen compared to the views on the periphery.

In yet a further embodiment, if a cached processed segment contains (a subset of) the requested views, then the cached processed segment can be used as (partial) input for the view-creation process instead of source segments. This requires less processing power, less network usage and speeds-up the processing time since no additional source content is required.

In case there is no source content is available for certain views, the edge server may create these views using another views, depth map, or any other visual information e.g. metadata so that an image-synthesizing technique can be applied for the missing views.

In some cases, the metadata associated with a source segment may be missing so that it is not possible for the edge server to property generate the requested segment. In such case, it may be advantageous that an edge can determine metadata by analyzing multi-view pictures so that parameters associated with the multi-view format can determined by the edge server. Detecting grid arrangement by detecting vertical and horizontal edges in the video frames so that the number of views in a multi-view picture can be determined. Further, parallax (disparity) estimation between the views may be used to estimate view angles of the views in a multi-view picture.

The multi-view video data described with reference to the embodiments in this application may be stored in different ways. In some embodiment, each view, i.e. the sequence of pictures associated with a view angle may be stored as a separate track (and as such identified in a manifest field). Such cases include multi-view video data that are encoded based on the MVC type codec wherein each view can be separated in different bitstream sub parts, e.g. NAL units, those sub parts of the same view overtime may be concatenated and stored in dedicated tracks per view. Similarly, multi-view pictures comprise a grid of pictures with different view angles such as the quilt format. Each picture in the grid may be encoded as a tile, e.g. using tile-based HEVC encoding, wherein each tile may form a track in a file. Tile-based encoding may be achieved on the basis of codecs such as HEVC, AV1 or WC.

Any 2D video codec may be used when encoding each view as separate bitstreams wherein each bitstream is then stored into a separate track.

Alternatively, the multi-view video data may be encoded in a bitstream comprising multiple views. Hence, such bitstream may be stored as a single track comprising multiple views. The quilt format includes pictures, typically referred to as multi-view pictures, comprising multiple views arranged in a grid. These pictures may be encoded and the resulting bitstream is then stored into a video track in the file. Further, any view interleaving scheme, e.g. interleaving each picture of each view angle to generate a sequence of pictures for which the resulting bitstream after encoding using any 2D video codec may be stored in a track. Similarly, the MVC type codec will generate bitstreams comprising multiple views and this bitstream is stored in the same track.

There maybe be several ways to signaling multi-view parameters within the MPD. The manifest files below illustrate examples that can be parsed by the server to extract the following multi-view parameters.

X=180
Angles-in-View=9
Window-Size: 4096×2160
Distance: 50 cm
Tilt:90
Format: Horizontal The following embodiment provide examples of targeted MPDs for a client device as may be used with the embodiments described in this application.

A first embodiment illustrates part of a manifest file wherein multi-view parameters are included in the filename. The manifest file defines a list of all segments, using SegmentList

```
<Representation mimeType="video/mp4" frameRate="24" bandwidth="1558322"
codecs="avc1.4d401f" width="4096" height="2160">
    <SegmentList duration="10">
        <Initialization sourceURL="
http://cdn.contentprovider.net/movie/X180_9_4096x2160_50_90_horizontal_5Mb-init.mp4"/>
        <SegmentURL media="
http://cdn.contentprovider.net/movie/X180_9_4096x2160_50_90_horizontal_5Mb-0.m4s"/>
        <SegmentURL media="
http://cdn.contentprovider.net/movie/X180_9_4096x2160_50_90_horizontal_5Mb-1.m4s"/>
        <SegmentURL media="
http://cdn.contentprovider.net/movie/X180_9_4096x2160_50_90_horizontal_5Mb-2.m4s"/>
        <SegmentURL media="
http://cdn.contentprovider.net/movie/X180_9_4096x2160_50_90_horizontal_5Mb-3.m4s"/>
        <SegmentURL media="
http://cdn.contentprovider.net/movie/X180_9_4096x2160_50_90_horizontal_5Mb-4.m4s"/>
    </SegmentList>
</Representation>
```

A further embodiment illustrates part of a manifest file multi-view parameters are included in the filename. In this embodiment however a segment template SegmentTemplates is used.

```
<Representation mimeType="video/mp4" frameRate="24" bandwidth="1558322"
codecs="avc1.4d401f" width="4096" height="2160">
   <SegmentTemplate
media="http://cdn.contentprovider.net/movie/X180_9_4096x2160_50_90_horizontal_5Mb-
$Number$.m4s"
initialization="http://cdn.contentprovider.net/movie/X180_9_4096x2160_50_90_horizontal_5Mb-
init.mp4"
      startNumber="0"
      timescale="24"
      duration="48"/>
   </Representation>
```

A further embodiment illustrates part of a manifest file wherein the multi-view parameters are inserted in the path part of a resource locator. In this embodiment, either a segment template SegmentTemplate or a segment list SegmentList may be used.

```
<Representation mime Type="video/mp4" frameRate="24" bandwidth="1558322"
codecs="avc1.4d401f" width="4096" height="2160">
   <SegmentTemplate
media="http://cdn.contentprovider.net/movie/X180/9/4096x2160/50/90/horizontal/5Mb-
$Number$.m4s"
initialization="http://cdn.contentprovider.net/movie/X180/9/4096x2160/50/90/horizontal/5Mb-init.mp4"
      startNumber="0"
      timescale="24"
      duration="48"/>
   </Representation>
```

A further embodiment provides a manifest file wherein the mufti-view parameters are inserted in the resource locators. This example contains a single Period element, that has a single AdaptationSet with two Representations (again with SegmentTemplate), each of the same characteristics, but with different bitrate.

```
<? xml version="1.0"?>
<MPD xmlns="urn:mpeg:dash:schema:mpd:2011" minBufferTime="PT1.500000S"
type="static" mediaPresentationDuration="PT0H2M20.00S">
   <Period duration="PT0H2M20.00S">
      <AdaptationSet segmentAlignment="true" bitstreamSwitching="true"
maxWidth="4096" maxHeight="2160" maxFrameRate="30" lang="und">
         <SegmentTemplate timescale="100" media="
http://cdn.contentprovider.net/movie/X180_9_4096x2160_50_90_horizontal_5Mb_$RepresentationID$
-$Number$.m4s " startNumber="0" duration="14000" initialization="
http://cdn.contentprovider.net/movie/X180_9_4096x2160_50_90_horizontal_5Mb_$RepresentationID$
-init.mp4"/>
         <Representation id="lowQ" mime Type="video/mp4" codecs=" avc1.4d401f"
width="4096" height="2160" frameRate="24" sar="1:1" startWithSAP="1" bandwidth="5000000">
         </Representation>
         <Representation id="highQ" mime Type="video/mp4" codecs=" avc1.4d401f"
width="4096" height="2160" frameRate="24" sar="1:1" startWith SAP="1" bandwidth="5000000">
         </Representation>
      </AdaptationSet>
   </Period>
</MPD>
```

It is submitted that the above examples are non-limiting examples on how multi-view parameters associated with segments comprising multi-view video data may be signalled to the edge server.

Figure 11:
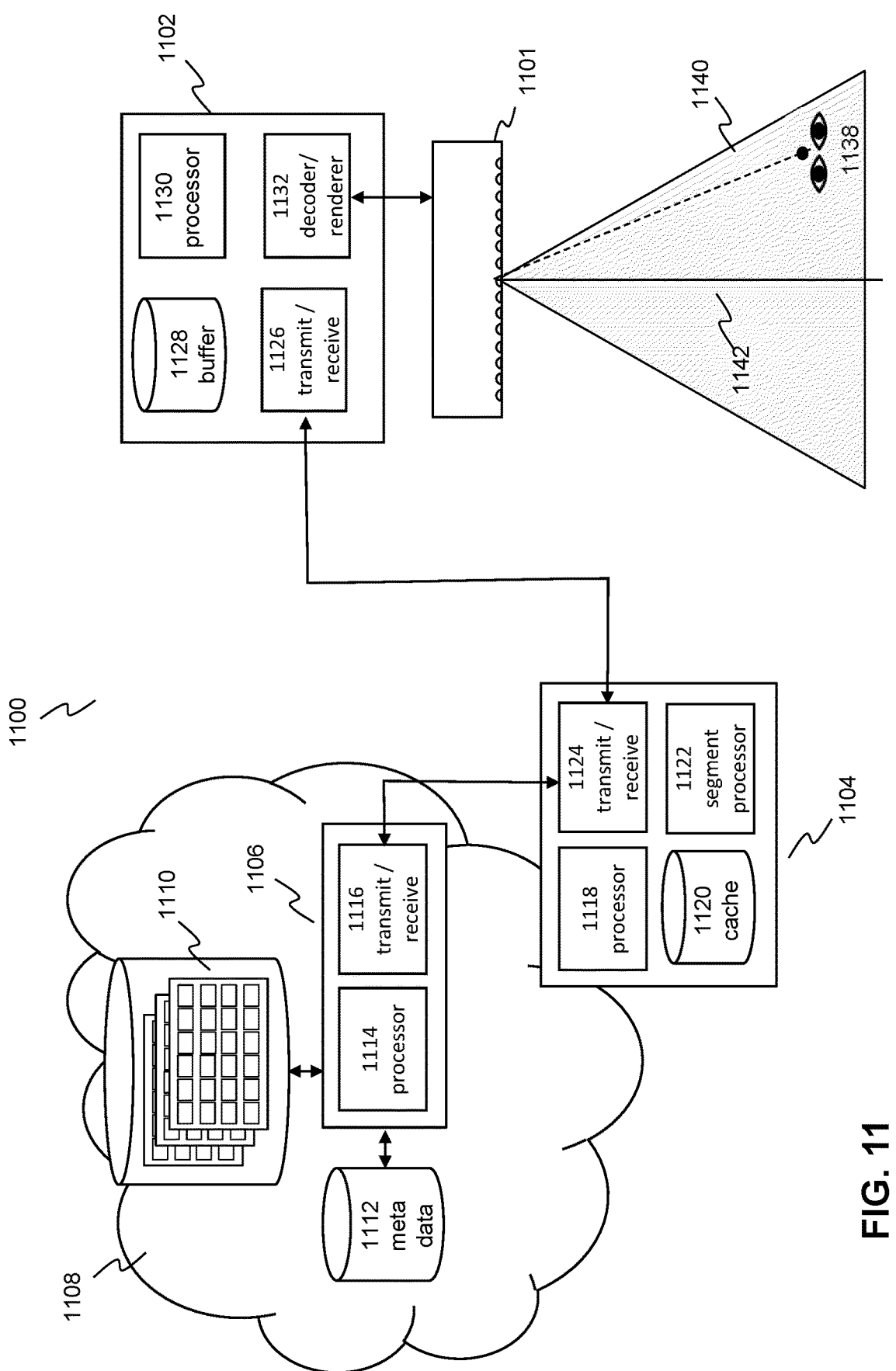
FIG. 11 depicts a system for streaming multi-view video according to an embodiment of the invention.

FIG. 11 depicts a schematic of a system for streaming and rendering multi-view video according to an embodiment of the invention. In particular, this figure schematically illustrates includes a system 1100 comprising a server system 1104,1106 for streaming video, in particular multi-view video, stored on one or more data storage devices 1110, e.g. a one or more media servers, to one or more client devices

1102. The client device may be a streaming client device, e.g. an MPEG DASH client, for adaptive streaming of segmented content. Typically, such client device may include a processor 1130 for controlling the processes executed by the client. To that end, the client device may include a device network interface 1126 for transmitting and receiving data from the server system, a buffer 1128 for storing segments and manifest files, e.g. MPDs. A client device may be connected to or include a decoder/rendering engine 1132 for decoding encoded video data, including encoded multi-view video data, and for simultaneously rendering a decoded pictures of different view angle by an output apparatus 1101, e.g. a display apparatus that is capable of rendering multi-view video as described with reference to the embodiments in this application.

Streaming technologies that may be used for streaming video to the client devices may include HTTP adaptive streaming (HAS) schemes, for example MPEG-DASH and HTTP Live Streaming (HLS), that specify adaptive bitrate video streaming schemes based on video data and associated metadata. The video data may be organized and structured based on a certain data format which may be defined by a HAS streaming standard or MPEG-CMAF which describes encoding and packaging schemes for segmented objects. CMAF is an ISO standard developed by MPEG harmonizing codec profiles and segment formats for HAS schemes such as MPEG-DASH and HLS. In some embodiments, the data format of the video data may include playback periods including one or more adaptation sets, an adaptation sets including media representations of different resolution and/ or quality and a representation including a sequence of media (video) segments, wherein a media segment includes a compressed video data of a predetermined quality.

The metadata associated with the video data may be organized in a manifest file or a manifest file update patch, which includes metadata to transform a manifest file a client device is currently using, into a manifest file for the next playback period. During the video creation process manifest files may be generated and stored together with the video data on a media storage device. A manifest file may be referred to in MPEG DASH as a Media Presentation Description (MPD) and may be structured in accordance with a certain machine-readable document format, e.g. XML or the like. A manifest file may comprise information about media assets, e.g. media streams including video and audio streams, that are available to the client device and information how a client device can retrieve these media assets. A manifest file may include segment identifiers, e.g. in the form of URLs, so that a client device is able to request video segments for a server. Different ways for signalling the segment identifiers may be used e.g. URL templating, explicit URLs, etc.

The server system 1104,1106 may include one or more network nodes, e.g. a first server 1106 controlled by a processor 1114 and comprising an network interface 1116 for providing data connections to one or more data storage devices 1110 for storing segmented content, including segmented multi-view video and to a storage device 1112 for storing metadata associated with the stored segmented content. The server system may further comprise a second server 1104 that include a processor 1118 and a network interface 1124 for setting up a data connection for streaming video data to client devices. This server may further include a cache 1120 for temporarily storing segments that are requested by client devices and a segment processor 1122 configured to process, e.g. resample and/or transform segments comprising multi-view video data, as described with reference to the embodiments in this application. The second server may be configured as an intermediate server between the client devices and the first server which may be part of a content delivery network. While the first and second server are illustrate as separate network nodes in other embodiments, the first and second server may form a server system.

The network interfaces of the servers and the client device may be a wired communication interface, such as an Ethernet or fiber-optic based interface. The network may for example be the Internet or a mobile network, wherein the streaming server may be connected to a fixed part of the mobile network. Alternatively, the network interface may for example be a wireless communication interface, which may also be referred to as a radio interface, and which may be configured to connect to a mobile network infrastructure. In some examples, the network interface may comprise a radio interface, for example an 4G or 5G radio interface for connecting to a 4G or 5G mobile network adhering to one or more 3GPP standards, or a Wi-Fi communication for connecting to a Wi-Fi network infrastructure or any other wireless interface.

In an embodiment, the second server may be implemented as a so-called edge server, i.e. a server which is located at the edge of a network. An edge server may for example be co-located with a base station of a wireless telecommunication network. This way, the edge server is physically located relatively close to client devices that are connected to the base station. This way a fast, low-delay data connection may be established between the edge server and a client device. For example, the connection between the edge server and the client device may e.g. be based on the 5G standard having a latency lower than the motion-to-high-quality latency that is required to enable an immersive experience by the user of the video processing device. For example, a Mobile Edge Computing or Multi-access Edge Computing (MEC) unit may be used wherein storage, networking resources and data processing, such as the video processing described with reference to the embodiments in this disclosure, may be integrated or associated with a base station, e.g. an eNodeB, that is part of a radio access network (RAN). This way, computer intensive and latency sensitive applications like multi-view video and augmented reality applications may be hosted at the edge of the network. The connection between the edge-server and the client device thus provides a fast data communication channel.

It is noted that the data communication between the streaming client and the streaming server may involve multiple networks. For example, the streaming client may be connected via a radio access network to a mobile network's infrastructure and via the mobile network's infrastructure to the Internet, with the streaming server being a server which is also connected to the Internet.

The processors of the servers and client devices may be configured, e.g., by hardware design or software, to perform the operations described in this application in as far as pertaining to a streaming server or in general to the streaming of video data of multi-view video of a scene to a client device. In general, the processor may be embodied by a single Central Processing Units (CPU), such as a x86 or ARM-based CPU, but also by a combination or system of such CPUs and/or other types of processing units.

The first and second server may be distributed over different entities, e.g., over different network nodes. In that case, their processors may also be distributed, e.g., over the CPUs of such different network nodes. The first server may comprise one or more data storage devices 1120,1112,1110, such as a hard drive or an array of hard drives, a solid-state drive or an array of solid-state drives, etc., which may be used to store data. In an embodiment, the first server may be a content delivery node, or may be implemented in a distributed manner using a number of content delivery nodes. In an embodiment, the content delivery nodes may be part of a content delivery network (CDN). The streaming server may also be implemented by another type of server or a system of such servers. For example, the streaming server may be implemented by one or more cloud servers or by one or more edge nodes of a mobile network.

The client device may be configured to process multi-view video data is formatted based on the characteristics of the display device as described with reference to the embodiments in this application. Similar to the server network interface, the client network interface may be a wired or a wireless network interface. For example, a radio network interface such as a 4G or 5G radio interface for connecting to a 4G or 5G mobile network adhering to one or more 3GPP standards, or a Wi-Fi communication interface for connecting to a Wi-Fi network infrastructure, etc. The data communication between the client and the server may involve multiple networks. For example, the streaming client may be connected via a radio access network to a mobile network's infrastructure and via the mobile network's infrastructure to the Internet, with the streaming server being a server which is also connected to the Internet. The client device may further comprise a processor configured, e.g., by hardware design or software, to perform the operations described in this specification in as far as pertaining to a client device or in general to the receiving, by streaming, of video data of multi-view videos of a scene. In general, the processor may be embodied by a single Central Processing Unit (CPU), such as a x86 or ARM-based CPU, but also by a combination or system of such CPUs and/or other types of processing units, such as Graphics Processing Units (GPUs).

Generally, the client device may be embodied by a (single) device or an apparatus capable of processing video data, e.g., a smartphone, personal computer, laptop, tablet device, gaming console, set-top box, television, monitor, projector, smart watch, smart glasses, media player, media recorder, etc. In some examples, the client device may be a so-called User Equipment (UE) of a mobile telecommunication network, such as a 5G or next-gen mobile network. In other examples, the client device may be an edge node of a network, such as an edge node of the aforementioned mobile telecommunication. In such examples, the client may lack a display output, or at least may not use the display output to display the received video data. Rather, the streaming client may receive the video data from a streaming server and reconstruct a multi-view video therefrom, which may then be made available for streaming, for example via tiled streaming, to a further downstream streaming client, such as an end-user device.

As shown in FIG. 11, the client device may be part of a video processing device, which may decoder to decode the encoded multi-view video data into pictures associated with different view angles. The decoded pictures may comprise for each time instance different pictures of the same scene for different view angles. A multi-view video rendering engine may be configured to simultaneously rendered (played out) the pictures of a multi-view video on a multi-view display apparatus. Here, 'rendering' refers to process steps by which the pictures may be converted into a displayable form.

The format of the multi-view video that is rendered by the display device depend on the application and/or display apparatus. For example, FIG. 11 may depict an application wherein the display apparatus is configured to render a "horizontal" holographic effect based on horizontal views only. In that case, it may be assumed that the display device is positioned at eye's height so that the viewer's position can be described as a 2D position relative to the central axis as depicted in the figure. More complex "true holographic effects" are rendered based on horizontal and vertical views. Hence, in that case, the position of the viewer is a 3D position relative to the central axis of the display device. In that case, a suitable coordinate system may be selected to determine the angular and radial position of the viewer relative to the central axis of the display device.

Figure 12:
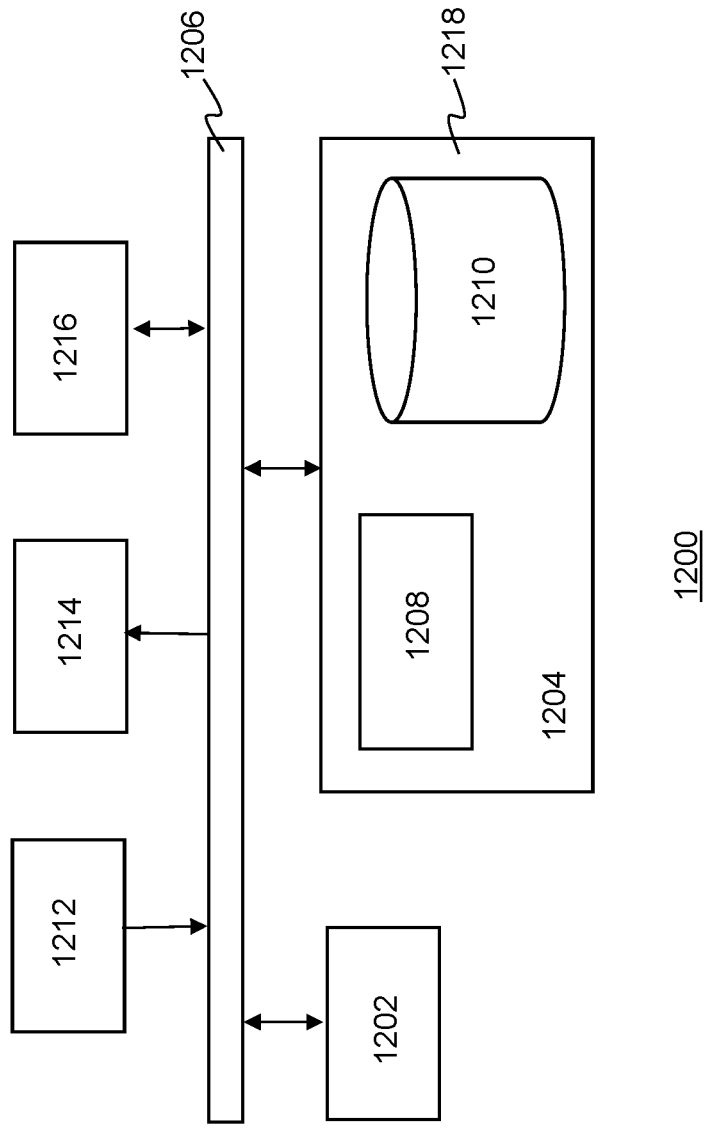
FIG. 12 is a block diagram illustrating an exemplary data processing system that may be used in as described in this disclosure.

FIG. 12 is a block diagram illustrating an exemplary data processing system that may be used in a client device or a server as described in this disclosure. Data processing system 1200 may include at least one processor 1202 coupled to memory elements 1204 through a system bus 1206. As such, the data processing system may store program code within memory elements 1204. Further, processor 1202 may execute the program code accessed from memory elements 1204 via a system bus 1206. In one aspect, data processing system may be implemented as a computer that is suitable for storing and/or executing program code. It should be appreciated, however, that data processing system 1200 may be implemented in the form of any system including a processor and memory that is capable of performing the functions described within this specification.

Memory elements 1204 may include one or more physical memory devices such as, for example, local memory 1208 and one or more bulk storage devices 1210. Local memory may refer to random access memory or other non-persistent memory device(s) generally used during actual execution of the program code. A bulk storage device may be implemented as a hard drive or other persistent data storage device. The processing system 1900 may also include one or more cache memories (not shown) that provide temporary storage of at least some program code in order to reduce the number of times program code must be retrieved from bulk storage device 1210 during execution.

Input/output (I/O) devices depicted as input device 1212 and output device 1214 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1216 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1200.

As pictured in FIG. 12, memory elements 1204 may store an application 1218. It should be appreciated that data processing system 1200 may further execute an operating system (not shown) that can facilitate execution of the application. Application, being implemented in the form of executable program code, can be executed by data processing system 1200, e.g., by processor 1202. Responsive to executing application, data processing system may be configured to perform one or more operations to be described herein in further detail.

In one aspect, for example, data processing system 1200 may represent a client data processing system. In that case, application 1218 may represent a client application that, when executed, configures data processing system 1200 to perform the various functions described herein with reference to a "client". Examples of a client can include, but are not limited to, a personal computer, a portable computer, a mobile phone, or the like.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. Method of processing multi-view video data by a server, the method comprising:
   receiving a plurality of first multi-view parameters from a client device, the plurality of first multi-view parameters being indicative of a first data format associated with a multi-view display device of the client device, wherein at least one of the plurality of first multi-view parameters is indicative of view angles required by the multi-view display device;
   receiving a request for a segment sent by the client device based on a manifest file, the segment request comprising a segment resource locator identifying a first source segment comprising first multi-view video data, the first multi-view video data defining an encoded representation of a set of pictures associated with a set of view angles, the segment resource locator comprising a plurality of second multi-view parameters indicating that the first multi-view video data are of a second data format;
   generating a segment of the first data format based on the plurality of first multi-view parameters, the first multi-view video data and, optionally, further multi-view video data associated with one or more further source segments, the generating the segment of the first data format comprising 1) selecting a subset of pictures from the set of pictures based on the view angles required by the multi-view display device, the subset of pictures being associated with a subset of view angles selected from the set of view angles; and 2) generating the segment of the first data format based on the subset of pictures; and,
   transmitting the generated segment to the client device.

2. Method according to claim 1 wherein receiving the plurality of first multi-view parameters includes:
   receiving a request message for a manifest file from the client device, the request message comprising the plurality of first multi-view parameters.

3. Method according to claim 2 wherein the request message, preferably a HTTP request message, comprises a string, preferably a query string, comprising at least part of the plurality of first multi-view parameters and/or wherein the request message, preferably a HTTP request message, comprises a header, the header comprising at least part of the plurality of first multi-view parameters.

4. Method according to claim 1 wherein the manifest file comprises segment identifiers for identifying segments comprising multi-view video data, and the manifest file comprises segment resource locators for locating one or more media servers configured to stream the segments, the segment resource locators including the segment resource locator identifying the first source segment, a resource locator associated with a segment comprising plurality of multi-view parameters indicative of a data format of the multi-view video data comprised in the segment.

5. Method according to claim 1, wherein the segment resource locator includes a string having a data format comprising one or more data fields, wherein the one or more data fields are associated with at least part of the plurality of first multi-view parameters respectively; and/or, wherein the segment resource locator comprises a path, wherein the path includes at least part of the plurality of first multi-view parameters; and/or wherein the segment resource locator comprises a source segment name in which at least part of the plurality of first multi-view parameters are embedded.

6. Method according to claim 1 wherein the method comprises:
   parsing the segment resource locator; and,
   extracting the plurality of second multi-view parameters from the segment resource locator.

7. Method according to claim 1 wherein the plurality of first and/or second multi-view parameters include at least one of:
   a number of view angles associated with encoded pictures in a segment;
   a packaging format of encoded pictures in a segment;
   a video codec used for encoding pictures in a segment;
   horizontal and/or vertical orientation of the view angles associated with encoded pictures in a segment.

8. Computer program product comprising a non-transitory computer-readable medium configured to store software code portions that, when run in the memory of a computer, execute the method steps according to claim 1.

9. Method of requesting multi-view video data by a client device from a server, the method comprising:
   sending a request for a manifest file to the server, the request comprising a plurality of first multi-view parameters indicative of a first data format associated with a multi-view display device of the client device, wherein at least one of the plurality of first multi-view parameters is indicative of the view angles required by the multi-view display device;
   receiving a manifest file comprising segment identifiers for identifying segments comprising multi-view video data, the first multi-view video data defining an encoded representation of a set of pictures associated with a set of view angles, the manifest file further comprising segment resource locators for locating one or more media servers configured to stream the segments, a resource locator associated with a segment comprising plurality of multi-view parameters indicative of a second data format of the multi-view video data comprised in the segment;

transmitting a request for a segment to the server based on the manifest file, the segment request comprising a segment resource locator identifying a first source segment comprising first multi-view video data, the segment resource locator comprising a plurality of second multi-view parameters indicating that the first multi-view video data are of a second data format; and, receiving a segment of the first data format from the server, which is configured to generate the segment of the first data format based on the plurality of first multi-view parameters and the first multi-view video data, the generating the segment of the first data format comprising 1) selecting a subset of pictures from the set of pictures based on the view angles required by the multi-view display device, the subset of pictures being associated with a subset of view angles selected from the set of view angles; and 2) generating the segment of the first data format based on the subset of pictures.

10. A client device for requesting multi-view video data from a server, the client device comprising:

a computer readable storage medium having computer readable program code embodied therewith, and a processor, coupled to the computer readable storage medium, wherein responsive to executing the computer readable program code, the processor is configured to perform executable operations comprising:

sending a request for a manifest file to the server, the request comprising a plurality of first multi-view parameters indicative of a first data format associated with a multi-view display device of the client device, wherein at least one of the a plurality of first multi-view parameters is indicative of the view angles required by the multi-view display device;

receiving a manifest file comprising segment identifiers for identifying segments comprising multi-view video data, the first multi-view video data defining an encoded representation of a set of pictures associated with a set of view angles, the manifest file further comprising segment resource locators for locating one or more media servers configured to stream the segments, a resource locator associated with a segment comprising a plurality of multi-view parameters indicative of a second data format of the multi-view video data comprised in the segment;

transmitting a request for a segment to the server based on the manifest file, the segment request comprising a segment resource locator identifying a first source segment comprising first multi-view video data, the segment resource locator comprising a plurality of second multi-view parameters indicating that the first multi-view video data are of a second data format; and, receiving a segment of the first data format from the server, which is configured to generate the segment of the first data format based on the plurality of first multi-view parameters and the first multi-view video data, the generating the segment of the first data format comprising 1) selecting a subset of pictures from the set of pictures based on the view angles required by the multi-view display apparatus, the subset of pictures being associated with a subset of view angles selected from the set of view angles; and 2) generating the segment of the first data format based on the subset of pictures.

11. A server for processing multi-view video comprising:

a computer readable storage medium having computer readable program code embodied therewith, and a processor, coupled to the computer readable storage medium, wherein responsive to executing the computer readable program code, the processor is configured to perform executable operations comprising:

receiving a plurality of first multi-view parameters from a client device, the plurality of first multi-view parameters being indicative of a first data format associated with a multi-view display device of the client device, wherein at least one of the plurality of first multi-view parameters is indicative of the view angles required by the multi-view display device;

receiving a request for a segment sent by the client device to a content source based on a manifest file, the segment request comprising a segment resource locator identifying a first source segment comprising first multi-view video data, the first multi-view video data defining an encoded representation of a set of pictures associated with a set of view angles, the segment resource locator comprising a plurality of second multi-view parameters indicating that the first multi-view video data are of a second data format;

generating a segment of the first data format based on the plurality of first multi-view parameters, the first multi-view video data and, optionally, further multi-view video data associated with one or more further source segments, the generating the segment of the first data format comprising 1) selecting a subset of pictures from the set of pictures based on the view angles required by the multi-view display apparatus, the subset of pictures being associated with a subset of view angles selected from the set of view angles; and 2) generating the segment of the first data format based on the subset of pictures; and, transmitting the generated segment to the client device.

12. The server according to claim 11, further configured to parse the segment resource locator; and, extract the plurality of second multi-view parameters from the segment resource locator.

\* \* \* \* \*